(12) United States Patent
Cai et al.

(10) Patent No.: US 7,548,743 B2
(45) Date of Patent: Jun. 16, 2009

(54) CALL CONTROL WITH CONVERGED APPLICATION SERVER LOGIC AND GATEWAY LOGIC IN IMS NETWORKS

(75) Inventors: Yigang Cai, Naperville, IL (US); Xiang Yang Li, Beijing (CN); Peng Wang, Beijing (CN); Jay Z. Zhao, Beijing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 977 days.

(21) Appl. No.: 11/000,307

(22) Filed: Nov. 30, 2004

(65) Prior Publication Data

US 2006/0114913 A1 Jun. 1, 2006

(51) Int. Cl.
*H04Q 7/20* (2006.01)
(52) U.S. Cl. ...................... 455/406; 370/466
(58) Field of Classification Search ........................ None
See application file for complete search history.

(56) References Cited

U.S. PATENT DOCUMENTS

| 2006/0003734 A1* | 1/2006 | Vallinen et al. ............. 455/406 |
| 2006/0045250 A1* | 3/2006 | Cai et al. .................... 379/126 |
| 2006/0114932 A1* | 6/2006 | Cai et al. .................... 370/466 |

FOREIGN PATENT DOCUMENTS

WO   WO 2004/004301 A1   1/2004

OTHER PUBLICATIONS

3rd Generation Partnership Project; Technical Specification Group Services and System Aspects; Telecommunication management; Charging management; Charging architecture and principles (Release 6); 3GPP TS 32.240 V6.0.0 (Sep. 2004).

3rd Generation Partnership Project; Technical Specification Group Service and System Aspects; Telecommunication management; Charging management; Diameter charging applications (Release 6); 3GPP TS 32.299 V6.0.0 (Sep. 2004).

$3^{rd}$ Generation Partnership Project; Technical Specification Group Services and Systems Aspects; Telecommunication manqagement; Charging management; Charging principles (Release 5); 3GPP TS 32.200 v5.7.0 (Jun. 2004).

$3^{rd}$ Generation Partnership Project; Technical Specification Group Service and System Aspects; Telecommunication management; Online Charging System (CS): Applications and Interfaces (Releases 6); 3GPP TS 32.296 v1.81.1 (Sep. 2004).

$3^{rd}$ Generation Partnership Project; Technical Specification Group Services and System Aspects; IP Multimedia Subsystem (IMS); Stage 2 (Release 6); 3GPP TS 23.228 v6.4.1 (Jan. 2004).

* cited by examiner

*Primary Examiner*—Erika A Gary

(57) ABSTRACT

IMS call control nodes and methods are disclosed for providing online charging in an IMS network. An IMS call control node receives a call message from a CSCF through a first interface for a call session, and determines whether to execute Application Server (AS) logic or gateway logic responsive to the call message. If the processing system determines that the call message should be processed with the AS logic, then the processing system executes the AS logic to perform a service and to contact the OCS for online charging for the service. If the processing system determines that the call message should be processed with the gateway logic, then the processing system executes the gateway logic to perform call session control and to contact the OCS for online charging for the call session.

18 Claims, 14 Drawing Sheets

CALL CONTROL WITH CONVERGED APPLICATION SERVER LOGIC AND GATEWAY LOGIC IN IMS NETWORKS

BACKGROUND OF THE INVENTION

1. Field of the Invention

The invention is related to the field of communications, and in particular, to IMS call control nodes and methods that converge Application Server (AS) logic and gateway logic for providing online charging in IMS networks.

2. Statement of the Problem

As set forth in the $3^{rd}$ Generation Partnership Project (3GPP), an IP Multimedia Subsystem (IMS) provides a common core network having an access-agnostic network architecture for converged networks. Service providers are accepting this architecture in next generation network evolution. Providing efficient IMS online charging for operator revenue generation is important to the successful deployment of IMS networks.

Several 3GPP technical specifications describe online charging for IMS networks. For instance, the 3GPP TS 32.200 specification describes an online charging server (OCS) having a session charging function. The OCS is coupled to a call session control function (CSCF) through an IMS service control (ISC) interface. The CSCF controls a call session for a calling party or called party and needs to communicate with the OCS over the ISC interface to provide online charging for the call session. However, an ISC interface is a service interface and does not support online charging. Therefore, in order to use the ISC interface between the CSCF and the OCS for online charging, additional functionality would unfortunately need to be added to the OCS.

In order to avoid overloading the OCS with additional functionality and to keep the online charging architecture consistent, the interface between the CSCF and the OCS may be changed to support online charging instead of adding functionality to the OCS. One option for an interface that supports online charging is to extend the ISC interface to allow for charging mechanisms. The ISC interface would then be both a service interface and a charging interface. Unfortunately, using the ISC interface as a hybrid service/charging interface may not be acceptable for standardization desired by the 3GPP.

Another option is to use the Ro interface instead of the ISC interface because the Ro interface already supports online charging. The 3GPP TS 32.296 specification suggests using the Ro interface for online charging by introducing an IMS gateway function that acts as a gateway between the CSCF and the OCS. The IMS gateway function as suggested in the 32.296 specification communicates with the CSCF over the ISC interface and communicates with the OCS over the Ro interface. Unfortunately, the 32.296 specification and the other 3GPP specifications do not describe how to use the IMS gateway function for online charging. For instance, the specifications do not define how the IMS gateway function is to operate to provide online charging. The specifications also do not resolve how the ISC interface, the Ro interface, and the CSCF would function together. For instance, the specifications state that whether the CSCF is directly connected to the OCS via a gateway (IMS gateway function) is beyond the scope of the standardization. The physical position of the IMS gateway function is in confusion in the specifications.

The specifications also describe the IMS network as including a plurality of application servers that are connected to an event-based charging function in the OCS. The application servers communicate with the OCS via an Ro interface, and communicate with the CSCF via an ISC interface. Unfortunately, the specifications do not define how the application servers communicate with the OCS to provide for session-based online charging for services.

The current 3GPP specifications do not adequately define how online charging may be accomplished for IMS networks. A problem remains for defining the functionality to enable online charging for IMS networks.

SUMMARY OF THE SOLUTION

The invention solves the above and other related problems by defining IMS call control nodes and methods for providing online charging in an IMS network. The IMS call control nodes and methods described herein advantageously define a manner of providing online charging or online session charging that was previously not defined either in the 3GPP specifications or other publications. Customers can then increase revenues by implementing the online charging functions.

One embodiment of the invention comprises an IMS call control node that is coupled to a call session control function (CSCF) and an online charging server (OCS) to provide online charging. The IMS call control node includes a first interface for communicating with the CSCF, a processing system, Application Server (AS) logic, gateway logic, and a second interface for communicating with the OCS. The first interface communicates with the CSCF according to a first protocol, where the first protocol does not support online charging. The second interface communicates with the OCS according to a second protocol that does support online charging.

In operation, the processing system receives a call message from the CSCF through the first interface. In response to the call message, the processing system determines whether to execute the AS logic or the gateway logic responsive to the call message. If the processing system determines that the call message should be processed with the AS logic, then the processing system executes the AS logic to perform a service. The processing system also executes the AS logic to contact the OCS for online charging for the service through the second interface according to the second protocol. If the processing system determines that the call message should be processed with the gateway logic, then the processing system executes the gateway logic to perform call session control. The processing system also executes the gateway logic to contact the OCS for online charging for the call session through the second interface according to the second protocol.

By consolidating the AS logic with the gateway logic in the IMS call control node, the consolidation simplifies IMS network topology and reduces call traffic between the CSCF and the OCS. The consolidation also improves performance and response time of services provided by the IMS call control node. The IMS call control node also provides for online charging of multiple services provided by the AS logic, and real-time session-based online charging for the call session.

The invention may include other exemplary embodiments described below.

DESCRIPTION OF THE DRAWINGS

The same reference number represents the same element on all drawings.

DETAILED DESCRIPTION OF THE INVENTION

FIGS. 1-14 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
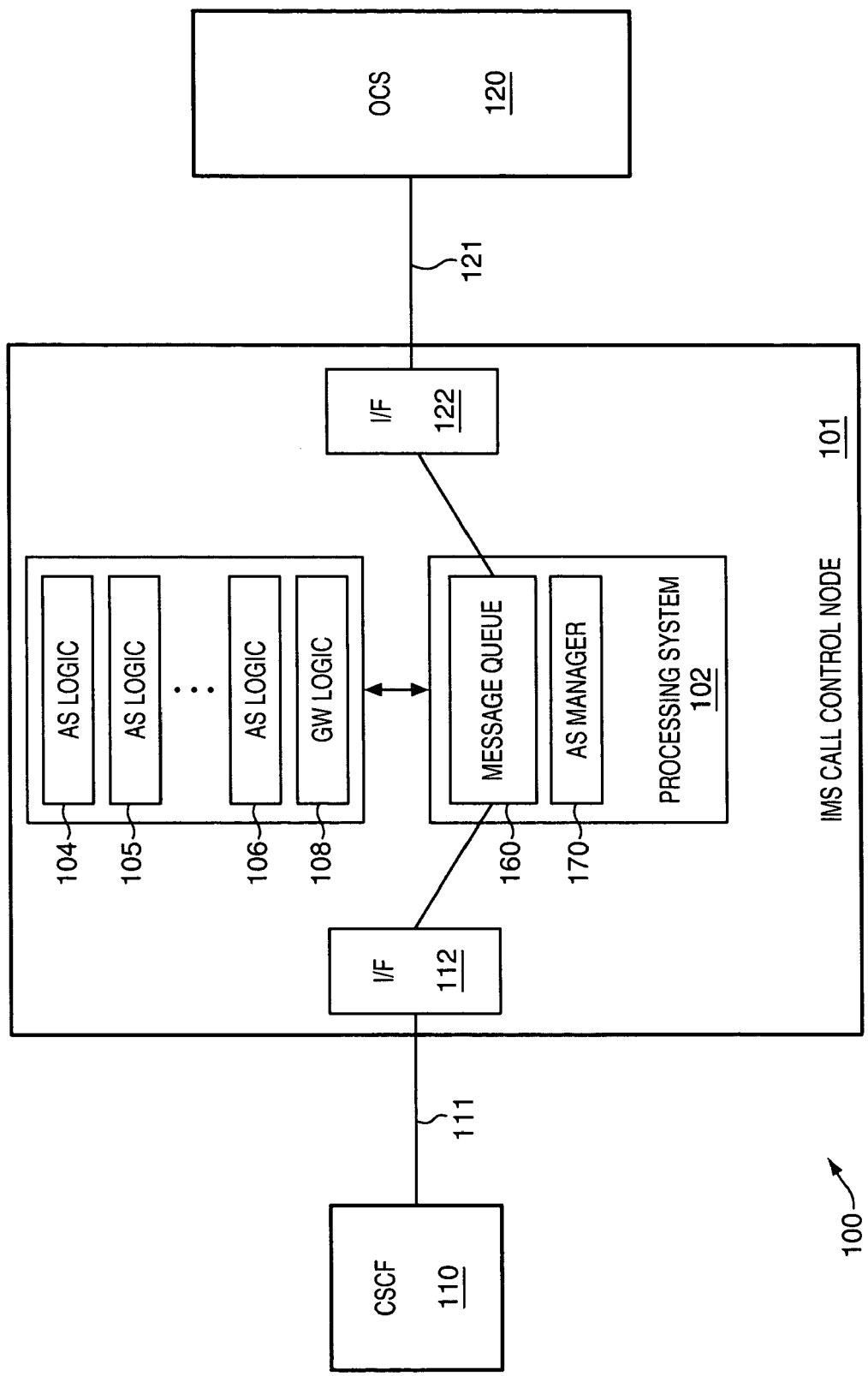
FIG. 1 illustrates an IP Multimedia Subsystem (IMS) network that provides online charging in an exemplary embodiment of the invention.

FIG. 1 illustrates an IP Multimedia Subsystem (IMS) network 100 that provides online charging in an exemplary embodiment of the invention. IMS network 100 includes a call session control function (CSCF) 110, an IMS call control node 101, and an online charging server (OCS) 120. IMS call control node 101 includes an interface 112 for communicating with CSCF 110, a processing system 102, Application Server (AS) logic 104-106, gateway logic 108, and an interface 122 for communicating with OCS 120. Interface 112 is coupled to CSCF 110 over a link 111 and communicates according to a first protocol. The first protocol does not support online charging. One example of the first protocol used by interface 112 and CSCF 110 is the IMS service control (ISC) protocol. Interface 122 is coupled to OCS 120 over a link 121 and communicates according to a second protocol different than the first protocol. The second protocol does support online charging. One example of the second protocol used by interface 122 and OCS 120 is the Ro protocol. IMS network 100 may include other components, devices, or systems not shown in FIG. 1.

In this embodiment, processing system 102 also includes a message queue 160 and an application server (AS) manager 170. Message queue 160 is configured to buffer any messages to be acted upon by processing system 102. AS manager 170 is configured to determine which AS logic 104-106 to execute. AS manager 170 is also configured to determine a sequence of AS logic 104-106 to execute, and generate a sequence list for executing the AS logic to perform a service.

IMS call control node 101 converges gateway logic and logic for multiple application servers into a single node. The logic of each application server may comprise an independent plug-in component. The term "logic" refers to any functionality, mechanism, software, firmware, or hardware that performs actions of an application server or a gateway. AS logic 104-106 and gateway logic 108 are both executable by processing system 102. AS logic 104-106 and gateway logic 108 may be stored on a storage media (not shown) that is accessible by processing system 102.

Figure 2:
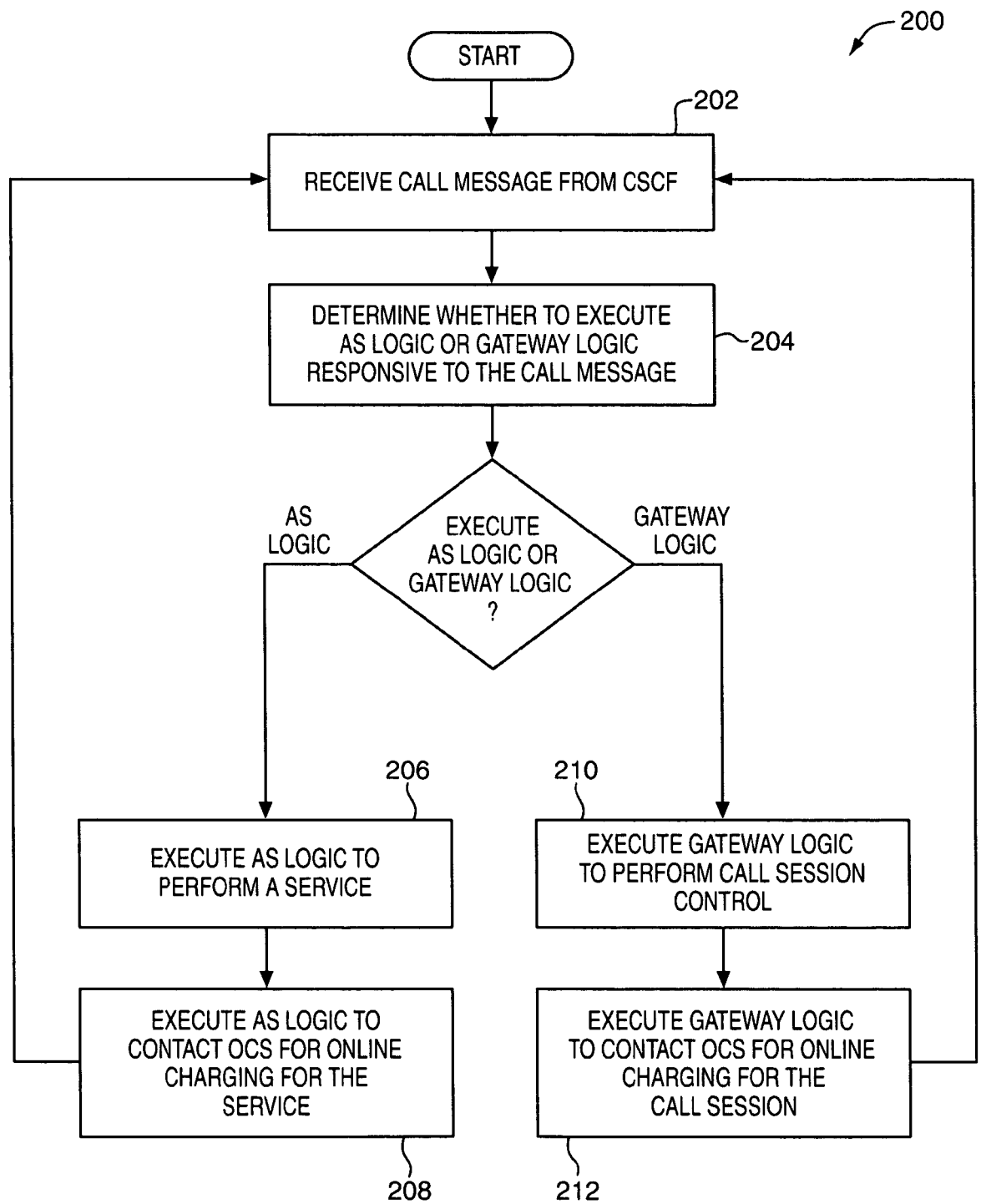
FIG. 2 is a flow chart illustrating a method of operating an IMS call control node in an exemplary embodiment of the invention.

FIG. 2 is a flow chart illustrating a method 200 of operating IMS call control node 101 in an exemplary embodiment of the invention. In step 202, processing system 102 receives a call message from CSCF 110 through interface 112. The call message is in the first protocol. The call message may comprise a SIP message, such as a SIP INVITE message, an OK message, an ACK message, etc. In response to the call message from CSCF 110, processing system 102 determines whether to execute AS logic 104-106 or gateway logic 108 responsive to the call message in step 204. In the determination, processing system 102 may first identify if the call message is requesting a service or is a call session control message. If the call message requests a service, then processing system 102 determines that AS logic 104-106 is used to process the call message. If the first message is not requesting a service but is concerned with setting up or maintaining a call session, then processing system 102 determines that gateway logic 108 is used to process the call message.

If processing system 102 determines that the call message should be processed with AS logic 104-106, then processing system 102 executes AS logic 104-106 to perform a service in step 206. Which of the AS logic 104-106 is executed depends on which service is to be performed. Processing system 102 also executes AS logic 104-106 to contact OCS 120 for online charging for the service through interface 122 according to the second protocol in step 208.

If processing system 102 determines that the call message should be processed with gateway logic 108, then processing system 102 executes gateway logic 108 to perform call session control in step 210. Processing system 102 also executes gateway logic 108 to contact OCS 120 for online charging for the call session through interface 122 according to the second protocol in step 212. The call session may be previously established or being initiated.

Assume for example that processing system 102 receives a first message from CSCF 110 during a call session. Processing system 102 processes the first message and determines that a first service is needed responsive to the first message. Processing system 102 then executes AS logic 104 to perform the first service. AS logic 104 determines if this is an online or offline call charge. If it is an offline charge, then AS logic 104 transmits charging information to offline charging nodes (not shown in FIG. 4). If it is an online charge, then processing system 102 executes AS logic 104 to contact OCS 120 for online charging for the first service. Processing system 102 contacts OCS 120 through interface 122 according to the second protocol.

Assume further that processing system 102 receives a second message from CSCF 110 during the call session. Processing system 102 processes the second message and determines that a second service is needed in response to the second message. Processing system 102 then executes AS logic 105 to perform the second service. Processing system 102 also executes AS logic 105 to contact OCS 120 for online charging for the second service. Processing system 102 contacts OCS 120 through interface 122 according to the second protocol.

Assume further that processing system 102 receives a third message from CSCF 110 during the call session. Processing system 102 processes the third message and determines that call session control is needed in response to the third message. Processing system 102 then executes gateway logic 108 to perform the call session control. Processing system 102 also executes gateway logic 108 to contact OCS 120 for online charging for the call session. Processing system 102 contacts OCS 120 through interface 122 according to the second protocol.

Figure 3:
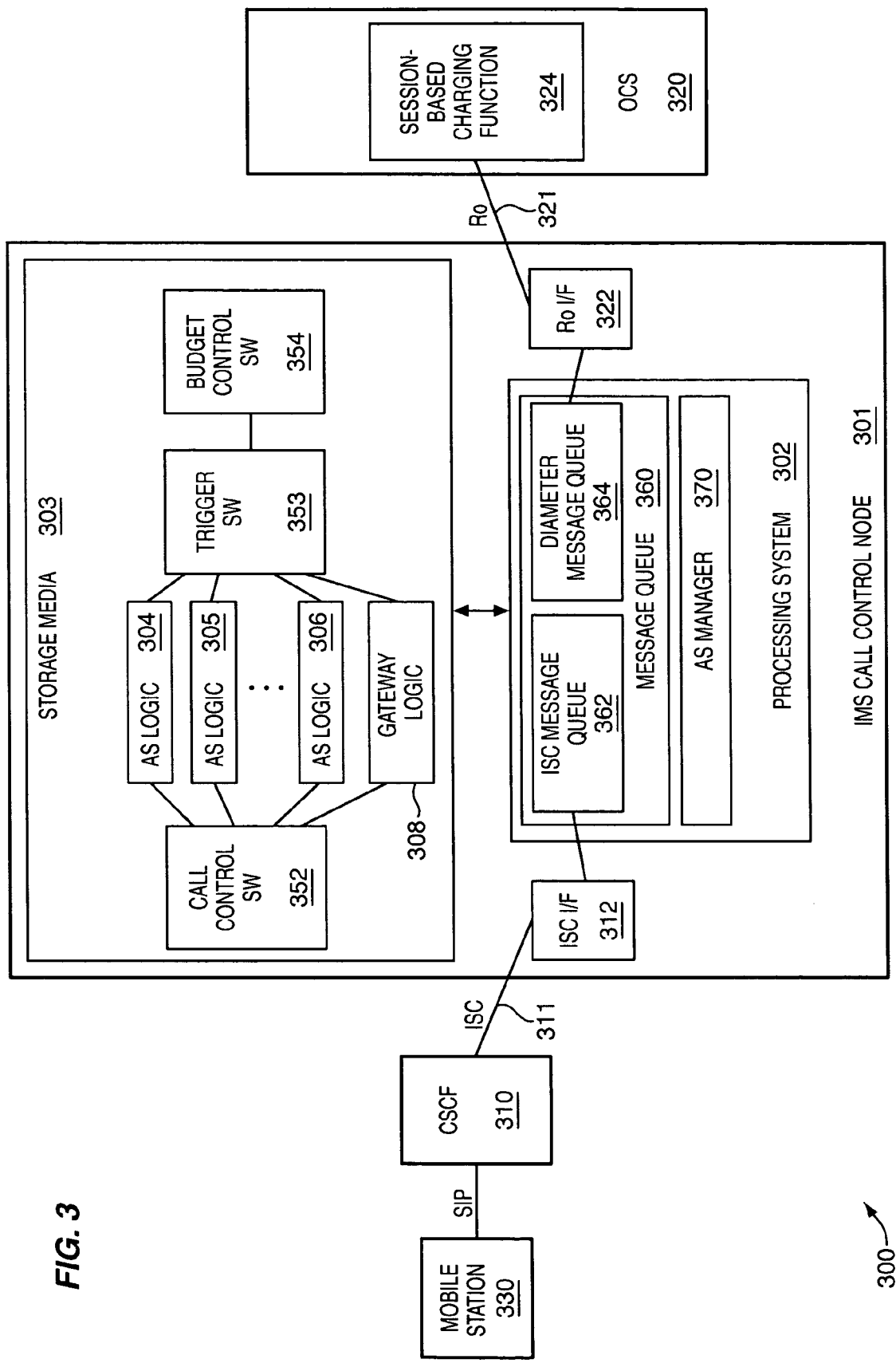
FIG. 3 illustrates an IMS network with an IMS call control node in another exemplary embodiment of the invention.

FIG. 3 illustrates an IMS network 300 with an IMS call control node 301 in another exemplary embodiment of the invention. IMS network 300 includes a mobile station 330, a call session control function (CSCF) 310, an IMS call control node 301, and an online charging server (OCS) 320. IMS call control node 301 is shown as being a separate node from CSCF 310 and OCS 320. IMS call control node 301 includes an ISC interface 312 for communicating with CSCF 310, a processing system 302, storage media 303, and an Ro interface 322 for communicating with OCS 320. Processing system 302 includes a message queue 360 and an application server (AS) manager 370. Message queue 360 includes an ISC message queue 362 and a diameter message queue 364.

ISC interface 312 is coupled to CSCF 310 over a link 311 and communicates according to an ISC protocol. For instance, ISC interface 312 may comprise a SIP interface or other similar protocol. Ro interface 322 is coupled to OCS 320 over a link 321 and communicates according to an Ro protocol. More particularly, Ro interface 322 is connected to a session-based charging function 324 in OCS 320 by link 321. IMS network 300 may include other components, devices, or systems not shown in FIG. 3.

Processing system 302 is configured to execute the logic and software stored in storage media 303. Storage media 303 stores Application Server (AS) logic 304-306, gateway logic 308, call control software 352, trigger software 353, and budget control software 354. The logic and software shown in FIG. 3 are comprised of instructions that are stored on storage media 303. The instructions can be retrieved and executed by processing system 302. Some examples of instructions are software, program code, and firmware. Some examples of storage media 303 are memory devices, tape, disks, integrated circuits, and servers. The instructions are operational when executed by processing system 302 to direct processing system 302 to operate in accord with the invention. The term "processing system" refers to a single processing device or a group of inter-operational processing devices. Some examples of processing systems are computers, integrated circuits, and logic circuitry. Those skilled in the art are familiar with instructions, processors, and storage media.

Processing system 302 maintains message queue 360 to implement the multiple independent plug-in "logic" interaction by application server (AS) manager 370. ISC message queue 362 buffer messages received from or destined to CSCF 310. ISC message queue 362 also buffers messages between AS logic 304-306. Diameter message queue 364 buffers messages received from or destined to OCS 320. AS manager 370 defines a particular sequence to execute AS logic to perform services. The output of one AS logic can be the input of another AS logic. The execution sequence of AS logic is configurable according to real-world application scenarios. Processing system 302 can disable one application without the impact to other service components. IMS call control node 301 can be configured as three kinds of application type:
 1) Pure IMS gateway
 2) Standalone Application Server
 3) Converged IMS Application Server IMS network 300 operates substantially as described in FIG. 2. Processing system 302 receives a call message from CSCF 310 through ISC interface 312. The call message is a SIP message, such as a SIP INVITE message, an OK message, an ACK message, etc. In response to the call message from CSCF 310, processing system 302 determines whether to execute AS logic 304-306 or gateway logic 308 responsive to the call message.

AS manager 370 processes the call message received from CSCF 310. Based on the call message, AS manager 370 determines a sequence of actions to be performed by AS logic 304-306 and/or gateway logic 308. AS manager 370 then generates an AS execution sequence list to be followed to perform one or more services. AS manager 370 allows for convergence of AS logic 304-306 and gateway logic 308 by defining the sequence in which the AS logic 304-306 and gateway logic 308 will be performed.

Figure 14:
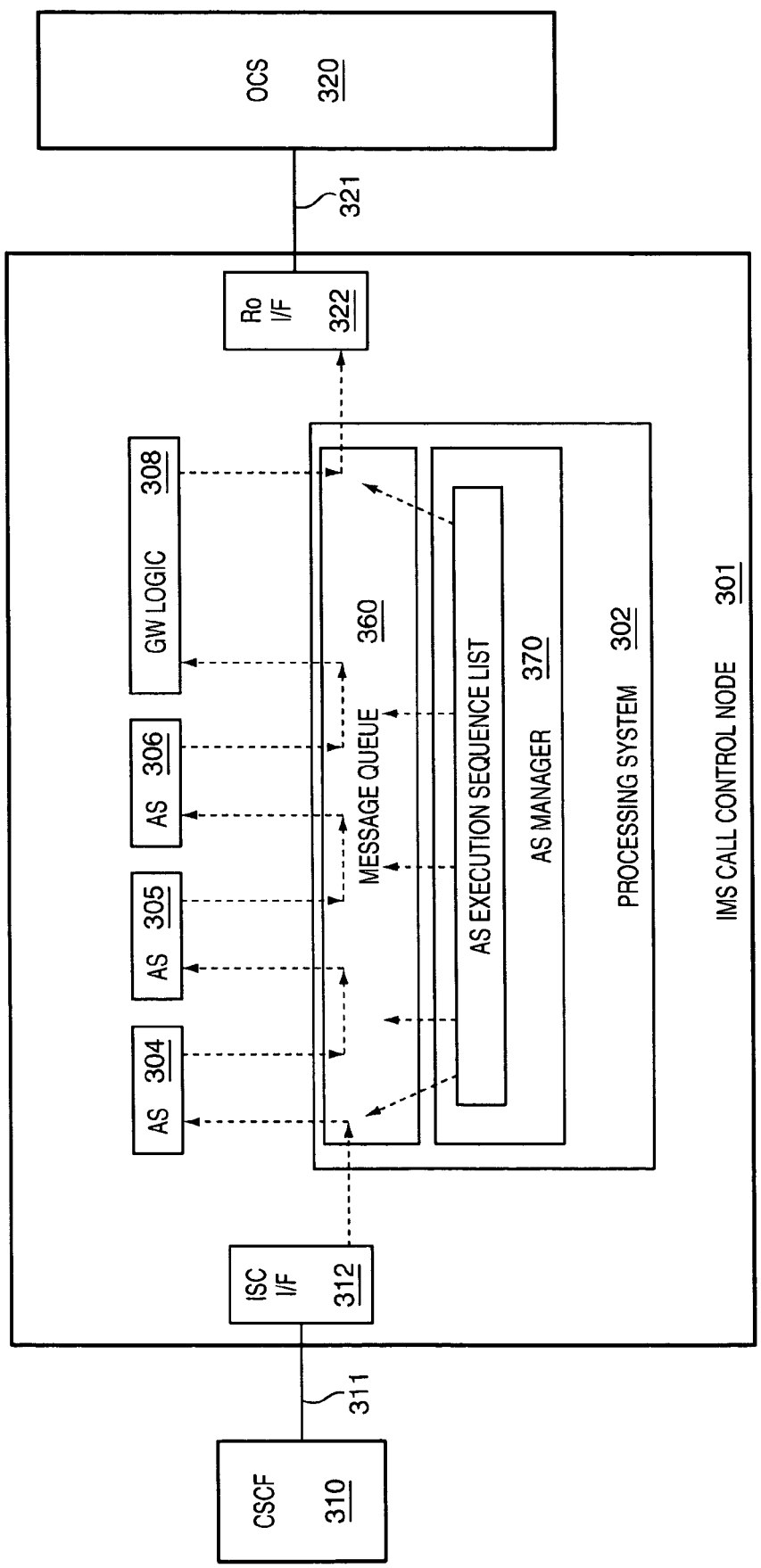
FIG. 14 illustrates convergence of logic in an IMS call control node in an exemplary embodiment of the invention.

FIG. 14 illustrates convergence of logic in IMS call control node 301 in an exemplary embodiment of the invention. In FIG. 14, message queue 360 receives a SIP message from CSCF 310 through ISC interface 312. AS manager 370 processes the SIP message to determine a sequence of actions to perform. AS manager 370 generates the AS execution sequence list that controls the actions to perform. Based on the AS execution sequence list, processing system 302 first executes AS logic 304. Processing system 302 then executes AS logic 305. Processing system 302 then executes AS logic 306. Lastly, processing system 302 executes gateway logic 308. As is illustrated in FIG. 14, the output of one AS logic can be the input to another AS logic.

In FIG. 3, if AS manager 370 determines that the call message should be processed with AS logic 304-306, then processing system 302 executes AS logic 304-306 to perform a service. Which of the AS logic 304-306 is executed depends on the AS execution sequence list. Processing system 302 also executes the AS logic 304-306 to contact OCS 320 for online charging for the service through Ro interface 322. More particularly, AS logic 304-306 contacts a session-based charging function 324 in OCS 320. AS logic 304-306 contacts OCS 320 by transmitting a Diameter Credit Control Application request message to OCS 320. AS logic 304-306 inserts charging information for the service into a new field or an extension field of the Diameter Credit Control Application request message to report the charging information for the service to OCS 320. The new field or extension field of the Ro interface 322 did not previously exist, but is added in the invention by IMS call control node 301 or another system or entity to allow for per-service online charging through Ro interface 322.

If AS manager 370 determines that the call message should be processed with gateway logic 308, then processing system 302 executes gateway logic 308 to perform call session control. Processing system 302 also executes gateway logic 308 to contact OCS 320 for online charging for the call session through Ro interface 322.

Figure 4:
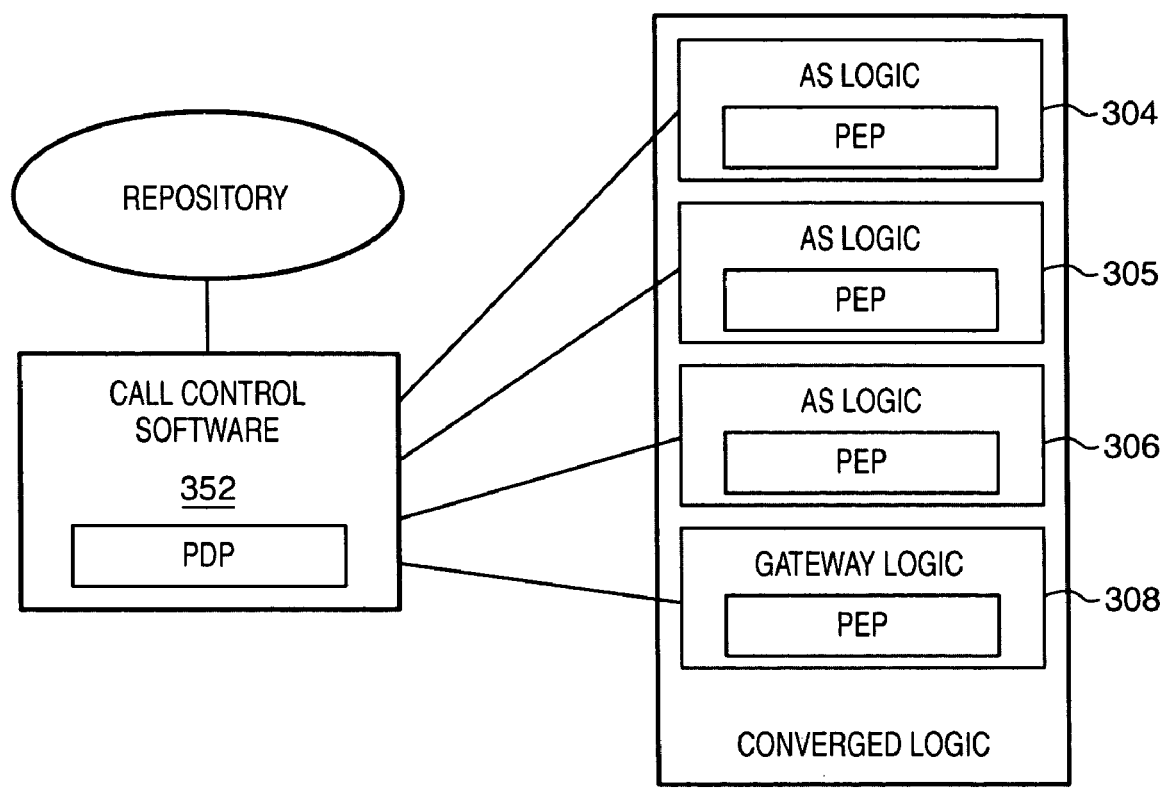
FIG. 4 illustrates call control in an IMS call control node in an exemplary embodiment of the invention.

FIG. 4 illustrates call control in the IMS call control node 301 in an embodiment of the invention. In this embodiment, the core service control logic is defined as a set of rules in call control software 352. The specific application service has its own service rule. All of the policy rules are stored in a policy repository accessible by call control software 352. The rules in the policy repository are divided into different categories, such as: time rule, location rule, calling party rule, called party rule, close user group rule, session treatment rule, QoS rule, media component rule, etc.

The policy enforcement point (PEP) in AS logic 304-306 communicates with a policy decision point (PDP) in the call control software 352 to reserve the decision request. The PDP accesses the policy repository to obtain relevant rules that are evaluated to determine the decision response. Once a decision response is obtained, AS logic 304-306 invokes functions to carry out the decision for service control and online charging purposes.

In the service policy management, a rule is expressed as a condition list and a sequence of actions.

```
IF      Condition_List
THEN
        Sequence_Actions
END IF
```

The condition list is constructed by a list of conditions linked by BOOLEAN operators AND, OR, and NOT in CNF (Conjunctive Normal Form). If a rule is invoked, the rule condition is evaluated in the PDP. If the rule condition is matched, then the actions under the rule are executed in order.

By using call presence application service for example, the service routes the subscriber's incoming call to a different location based on the day of the week, the time of day, and the calling party role. The following gives some detailed rules about call presence in IMS call control.

Time category is determined as the following rules:

| Day_of_Week | Begin_Time | End_Time | Time_Category |
|---|---|---|---|
| Monday | 8:30 AM | 5:30 PM | Working Hour |
| Monday | 5:31 PM | 11:30 PM | Family Hour |
| Monday | 11:31 PM | 7:30 AM | Sleeping Hour |
| ... | ... | ... | ... |

```
IF   Day_of_Week = "Monday" AND Begin_Time = "8:30AM"
     AND End_Time = "5:30PM"
THEN Time_Category = "Working Hour"
END IF
IF   Day_of_Week = "Monday" AND Begin_Time = "5:31PM"
     AND End_Time = "11:30 PM"
THEN Time_Category = "Family Hour"
END IF
```

If subscriber 13579848 receives an incoming IMS call, the calling party role is determined by the following rules:

| Calling_Party_Number | Called_Party_Number | Calling_Party_Category |
|---|---|---|
| 13599090 | 13579848 | Boss |
| 13599091 | 13579848 | Colleague |
| ... | ... | ... |

```
IF      Call_Direction = "Incoming" AND
Called_Party_Number = 13579848 AND
Calling_Party_Number = 13599090
THEN Calling_Party_Role = "Boss"
END IF
IF      Call_Direction = "Incoming" AND
Called_Party_Number = 13579848 AND
Calling_Party_Number = 13599091
THEN Calling_Party_Role = "Colleague"
END IF
```

The presence of the subscriber 13579848 is determined by the following rules:

| Time_Category | Calling_Party_Category | Action #1 | Action #2 | Action #3 |
|---|---|---|---|---|
| Working Hour | Boss | Office Phone | Personal Phone | Voice Mail |
| Family Hour | Boss | Personal Phone | Voice Mail | NULL |
| Family Hour | Colleague | Voice Mail | NULL | NULL |
| ... | ... | ... | ... | ... |

```
IF   Time_Category = "Working Hour" And
Calling_Party_Category = "Boss"
THEN Ring Call to "Office Phone"
THEN Ring Call to "Personal Phone"
THEN Ring Call to "Voice Mail Box"
END IF
IF   Time_Category = "Family Hour" And
Calling_Party_Category = "Boss"
THEN Ring Call to "Personal Phone"
THEN Ring Call to "Voice Mail Box"
    END IF
    IF       Time_Category = "Family Hour" And
Calling_Party_Category = "Colleague"
    THEN Ring Call to "Voice Mail Box"
    END IF
```

Figure 5:
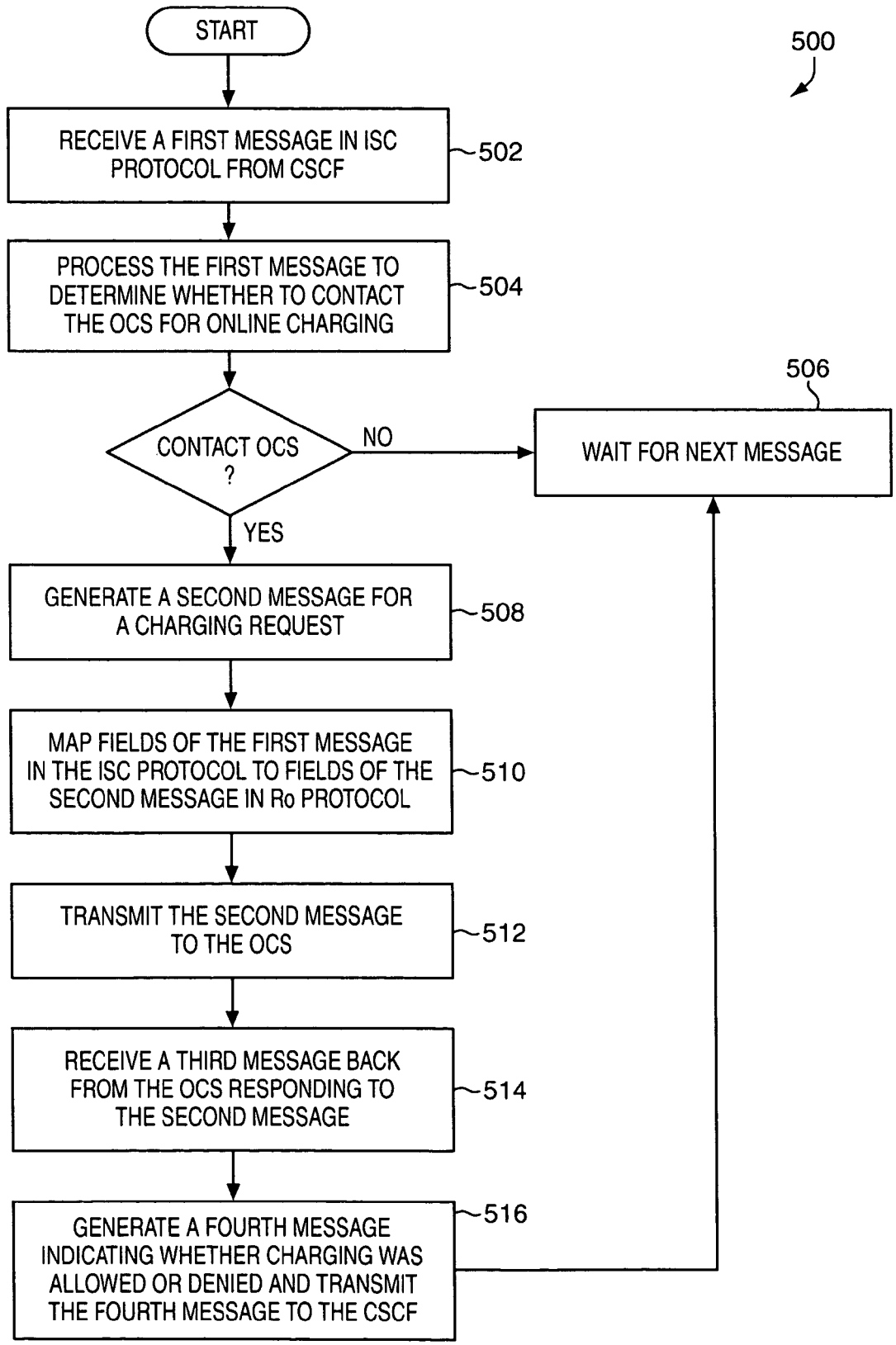
FIG. 5 is a flow chart illustrating a method of executing trigger software to provide online charging in an exemplary embodiment of the invention.

FIG. 5 is a flow chart illustrating a method 500 of executing trigger software 353 to provide online charging in an exemplary embodiment of the invention. For method 500, processing system 302 executes trigger software 353 to do the following. In step 502, trigger software 353 receives a first message from CSCF 310 for a call session through ISC interface 312. The call session may be already established or may be initiated by the first message. The first message is a SIP message, such as a SIP INVITE message, or a message of another protocol. In step 504, trigger software 353 processes the first message to determine whether to contact OCS 320 for online charging for the call session. For step 504, trigger software 353 may identify a rule and process the first message based on the rule. For instance, a rule may include one or more conditions. If the conditions are satisfied for the first message, then trigger software 353 performs the actions defined in the rule. One of the actions may be to contact OCS 320 regarding online charging. This rule-based approach allows for flexibility in defining under which conditions trigger software 353 contacts OCS 320 to report the charging record.

If the determination is not to contact OCS 320, then trigger software 353 waits for the next message from CSCF 310 in step 506. If the determination is to contact OCS 320, then trigger software 353 generates a second message that comprises a charging request to transmit to OCS 320 in step 508. One example of the second message is a Credit Control Request (CCR). In step 510, trigger software 353 maps fields of the first message in the ISC protocol to fields in the second message in the Ro protocol. In step 512, trigger software 353 transmits the second message to OCS 320 through Ro interface 322. The second message provides OCS 320 with the proper information to perform online charging functions for the call session, such as validating the subscriber of the call session, determining a pre-paid balance for the subscriber, determining call session information and a rate for the call session, granting units for the call session, decrementing an amount of units from an account for the subscriber, or any other online charging functions.

Responsive to OCS 320 performing one or more charging functions, trigger software 353 receives a third message from OCS 320 responding to the second message in step 514. In the third message, OCS 320 may indicate whether the subscriber has a sufficient number of units to initiate or maintain a call session, whether to allow or deny charging for a call session, or any other information relating to online charging of the call session. In step 516, trigger software 353 generates a fourth message indicating whether charging was allowed or denied for the call session from OCS 320 and transmits the fourth message to CSCF 310 through ISC interface 312.

Figure 6:
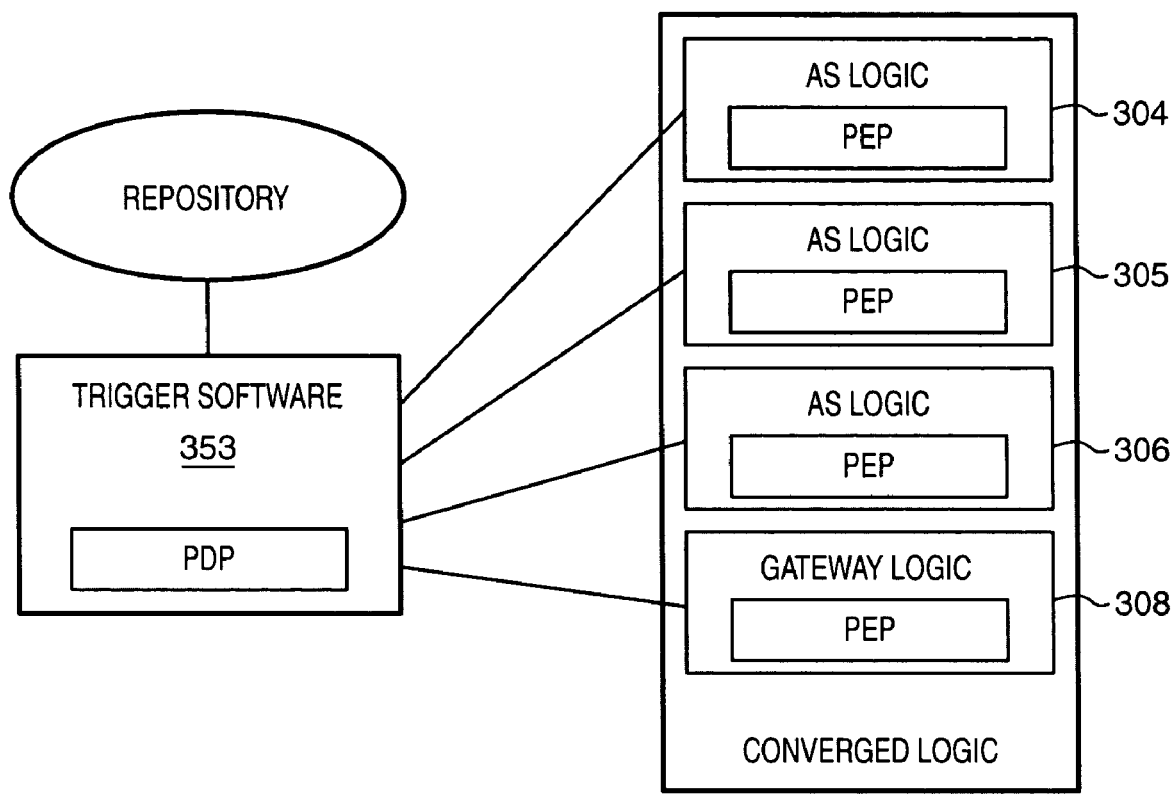
FIG. 6 further illustrates triggering by trigger software in an exemplary embodiment of the invention.

FIG. 6 further illustrates triggering by trigger software 353 in an exemplary embodiment of the invention. Processing system 302 executes trigger software 353 to provide subscriber online charging. In this embodiment, charging trigger points are defined as a group of rules to match SIP/SDP (Session Initiation Protocol/Session Description Protocol) messages: SIP method rule, Request-URI rule, SIP header rule, Session Case rule, Session Description rule. The charging trigger point enables the following information to be reported to OCS 320 by IMS call control node 301: (1) basic IMS call information; (2) media component update within an IMS session; (3) QoS update within an IMS session; and (4) mobile location update within an IMS session.

The policy rules are stored in a repository accessible by trigger software 353. A rule is expressed as a condition list and a sequence of actions. For instance, a rule may be expressed as:

```
IF   Condition_List
THEN
     Sequence_Actions
END IF
```

The condition list is constructed with a list of conditions linked by a Boolean operator AND, OR, and NOT in CNF (Conjunctive Normal Form). When a rule is invoked, the rule condition is evaluated. If the rule conditions are matched, then the actions under the rule will be executed in the order.

In this embodiment, the charging trigger points are defined into three kinds of monitor type: INTERRUPT type, NOTIFY type, or NULL type (trigger is not armed). If a trigger point is configured as INTERRUPT type and the trigger criteria is matched, then IMS call control node 301 suspends IMS session processing and waits for instructions from OCS 320. If a trigger point is configured as NOTIFY type and the trigger criteria is matched, then IMS call control node 301 transmits session information to OCS 320 and continues with the session processing. If the charging trigger is not armed in IMS call control node 301, then IMS call control node 301 returns the SIP message to CSCF 310 to continue the current session without any charging control relationship. The following lists examples of triggers:

```
IF   SIP_Method = "INVITE" AND Call_Status = "NULL"
AND Trigger_Point_Type = "INTERRUPT"
THEN
     Hold on the current session
     Send "CCR [INITIAL]" charging report to OCS
     Start timer to wait "CCA [INITIAL]" from OCS
END IF
IF   SIP_Method = "200" AND Call_Status =
"WAIT_FOR_CALL_ANSWER" AND Trigger_Point_Type =
"NOTIFY"
THEN
     Continue the current session.
     Send "CCR [UPDATE]" charging report to OCS
     Start timer to wait for "CCA [UPDATE]" from OCS
END IF
```

Figure 7:
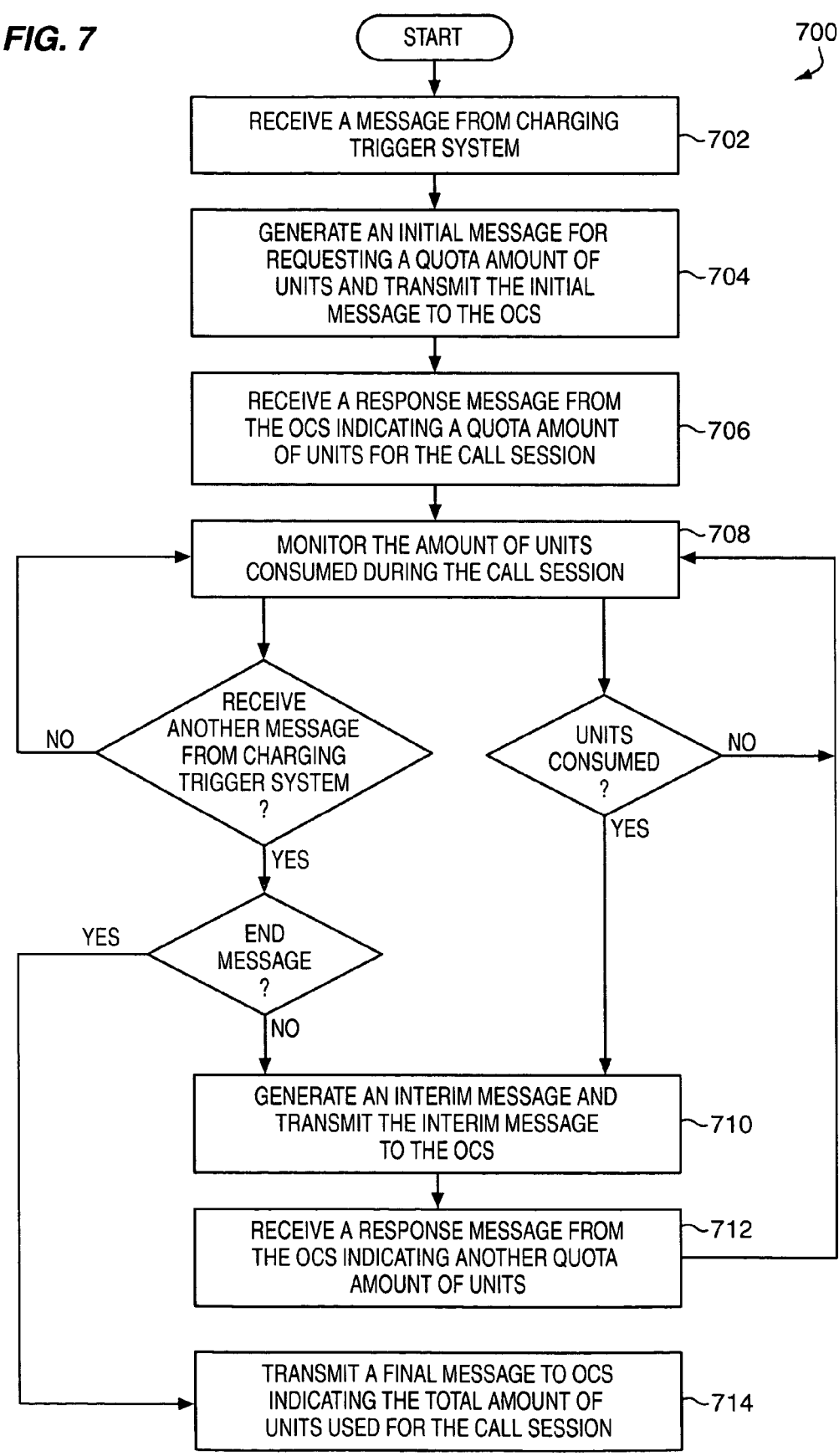
FIG. 7 illustrates a method of executing budget control software in an exemplary embodiment of the invention.

FIG. 7 illustrates a method 700 of executing budget control software 354 in an exemplary embodiment of the invention. In step 702, budget control software 354 receives a message from trigger software 353 indicating that trigger software 353 is transmitting a message to OCS 320 for a charging request. Responsive to receiving the message from trigger software 353, budget control software 354 generates an initial message in step 704, and transmits the initial message to OCS 320 through Ro interface 322. The initial message requests a quota amount of units from OCS 320. The initial message also provides OCS 320 the proper information to identify the subscriber, identify an account for the subscriber and determine a balance in the account, and determine a quota amount of units to allocate to budget control software 354. The term "units" is being used to describe a balance for a subscriber, and "units" may refer to any unit of measure, such as minutes or currency. The initial message may comprise a CCR message.

In step 706, budget control software 354 receives a response message from OCS 320 indicating a quota amount of units for the call session allocated to budget control software 354. The quota amount of units comprises any amount allowed or provided by OCS 320. The quota amount of units does not necessarily indicate the total balance of the account of the subscriber. The response message may comprise a CCA message. In step 708, budget control software 354 monitors the amount of units consumed during the call session.

If the quota amount of units is consumed during the call session or another message is received from trigger software 353, then budget control software 354 generates an interim message and transmits the interim message to OCS 320 through Ro interface 322 in step 710. The interim message indicates the number of units consumed. The interim message also requests a new quota of units from OCS 320. In step 712, budget control software 354 receives a response message from OCS 320 indicating another quota amount of units for the call session allocated to budget control software 354. Budget control software 354 then monitors the amount of units consumed during the call session as provided in step 708.

If budget control software 354 receives a message from trigger software 353 indicating that the call session is ending or has ended, then budget control software 354 generates a final message in step 714, and transmits the final message to OCS 320 through Ro interface 322. The final message reports the total amount of units used for the call session.

Figure 8:
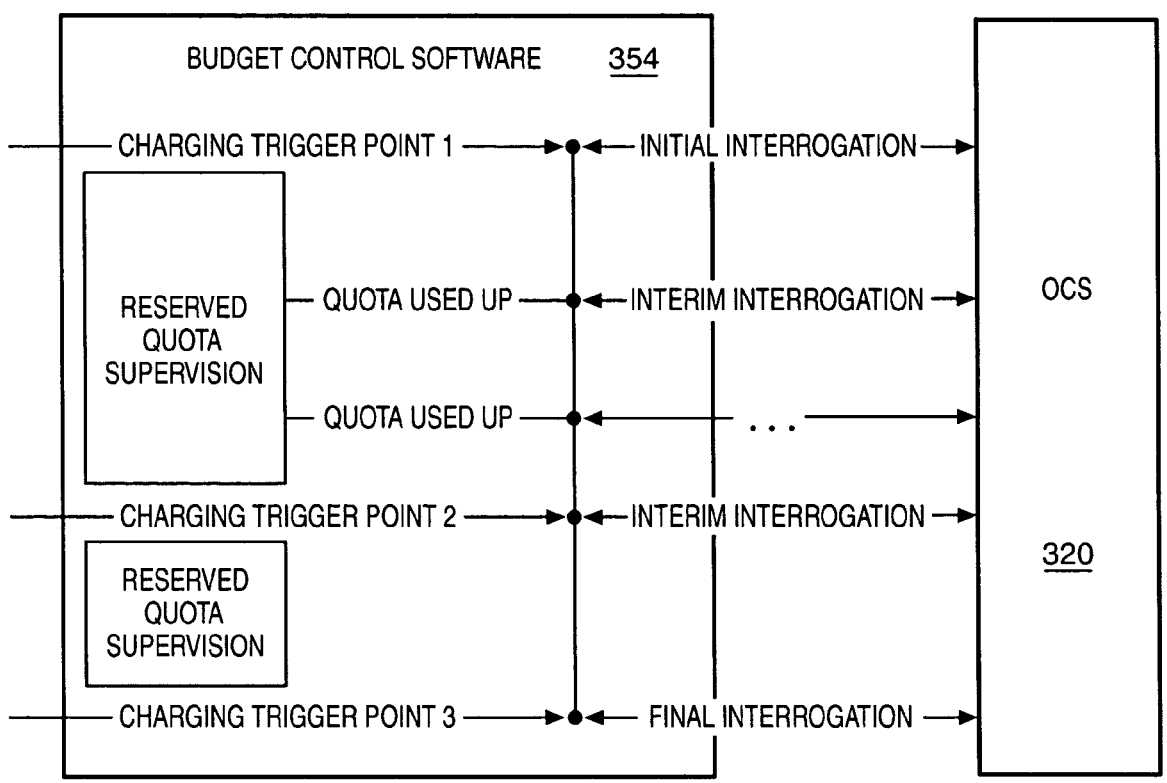
FIG. 8 further illustrates budget control software communicating with an OCS in an exemplary embodiment of the invention.

FIG. 8 further illustrates budget control software 354 communicating with OCS 320 in an exemplary embodiment of the invention. Budget control software 354 communicates with OCS 320 via Ro interface 322, which is an extension of the Credit-Control-Request (CCR) and Credit-Control-Answer (CCA) defined in the draft IETF Diameter Credit Control Application protocol. Budget control software 354 is based on a series of "interrogations" between IMS call control node 301 and OCS 320 via Ro interface 322. The interrogations comprise an initial interrogation, one or more interim interrogations, and a final interrogation. Each interrogation is composed of a CCR-CCA pair.

In the initial interrogation (i.e. CCR [INITIAL] and CCA [INITIAL]), budget control software 354 transmits an initial message (i.e. CCR [INITIAL]) to OCS 320 to request a quota amount of units from OCS 320. Budget control software 354 receives a response message (i.e. CCA [INITIAL]) from OCS 320 indicating a reserved quota of units. When the reserved quota is consumed to a defined threshold, or the next charging point is triggered, budget control software 354 transmits an interim message to OCS 320 as an interim interrogation (i.e. CCR [UPDATE] and CCA [UPDATE]) to report the actual number of quota units until the current charging point. Budget control software 354 also requests a new quota of units for the next charging point. In a final interrogation (i.e. CCR [TERMINATION] and CCA [TERMINATION]), budget control software 354 reports the total used units consumed in the IMS call session.

When contacting OCS 320, gateway logic 320 can map fields from the ISC messages to fields in the Ro messages to provide charging requests for the call session. When AS logic 304-306 contacts OCS 320 through Ro interface 322, there is currently no field for charging requests for the service provided by AS logic 304-306. For the different services performed by AS logic 304-306, different service usage may perform different online charging.

Figure 9:
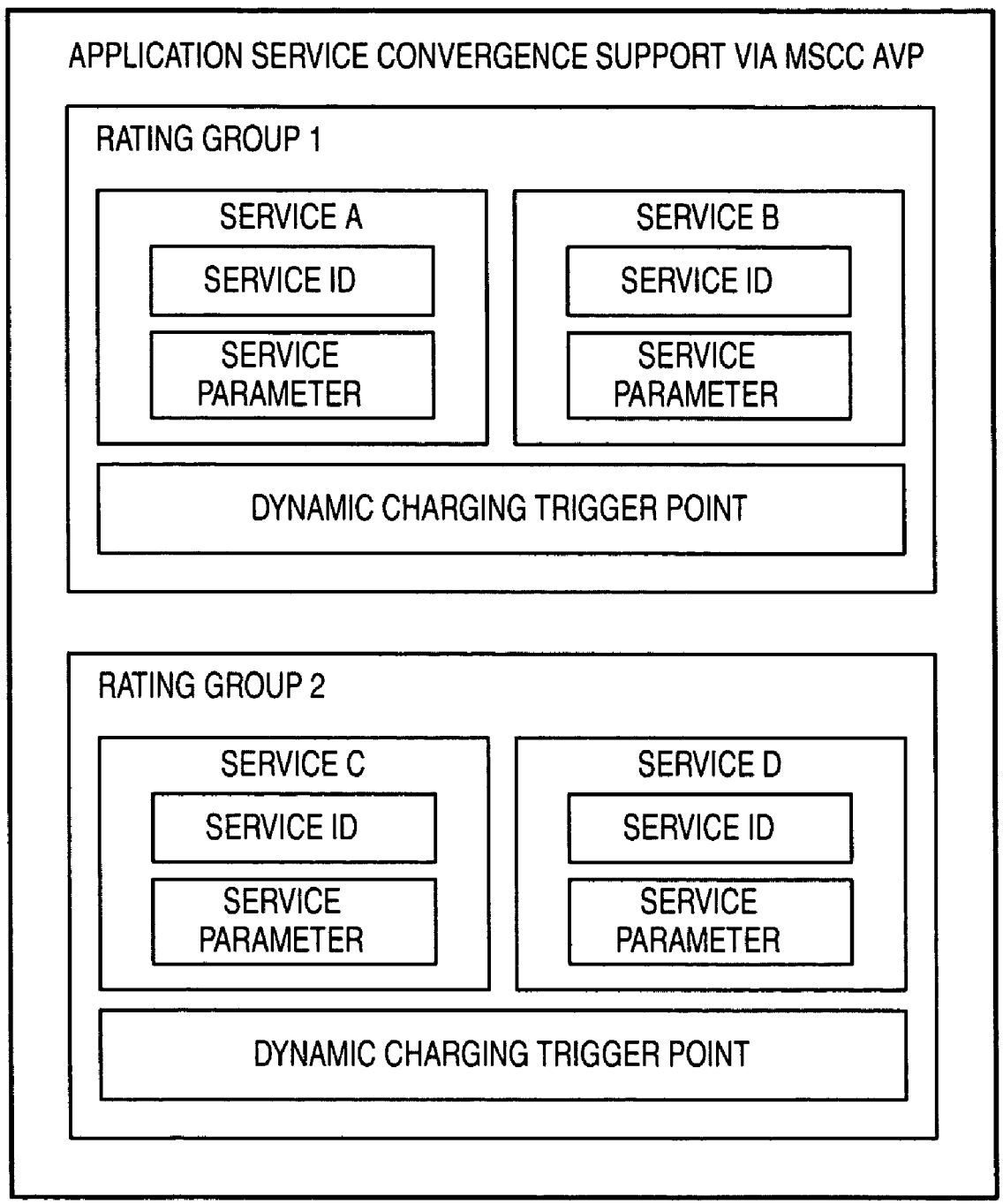
FIG. 9 illustrates a new field for the Ro protocol in an exemplary embodiment of the invention.

FIG. 9 illustrates a new field for the Ro protocol in an exemplary embodiment of the invention. IMS call control node 301 supports independent online charging on a per-service basis. To optimally support these scenarios, instead of sending multiple Ro requests for each service's charging request, IMS call control node 301 supports a Multiple-Service-Credit-Control (MSCC) Attribute Value Pair (AVP) to send one Diameter Credit Control Application request message including multiple services' charging to OCS 320. In IMS call control node 301, each service is identified by a service identifier. The multiple services, which have the same charging characteristic, can be grouped into a rating group. The rule to determine the rating group is based on the service ID and service parameter. The abstract rating group rule may be expressed as the following:

```
IF      Service_ID AND IMS_Parameter
THEN    Rating Group
END IF
```

The 3GPP defined Ro interface, which is based on an extension for the Diameter Credit Control Application protocol in IETF, cannot meet the application service convergence support. Therefore, IMS call control node 301 defines a new dynamic charging trigger point AVP to extend the Multiple-Service-Credit-Control (MSCC) AVP to support the dynamic charging record report. When IMS call control node 301 gets a dynamic charging trigger point from the Ro response, IMS call control node 301 dynamically provisions the charging record report filter into the rule repository. For the subsequent on-going message, the PEP in gateway logic 308 requests the PDP to evaluate the IMS call information. When the charging report filter rule is matched, IMS call control node 301 determines to send the charging report to OCS 320.

Figure 10:
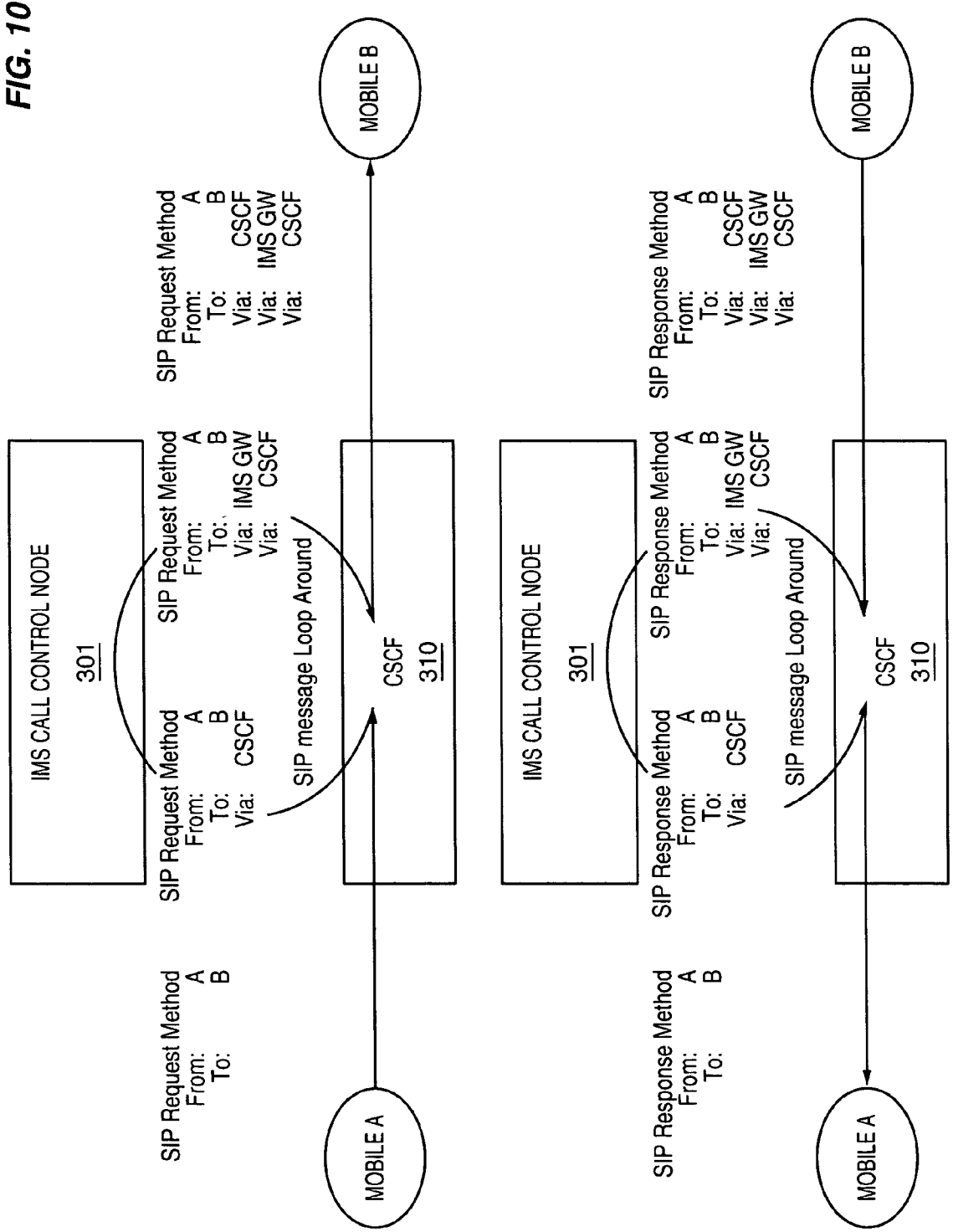
FIG. 10 illustrates a loop around mechanism used to implement SIP message routing between a CSCF and an IMS call control node.

FIG. 10 illustrates a loop around mechanism used to implement SIP message routing between CSCF 310 and IMS call control node 301. The loop around mechanism enables IMS call control node 301 to execute the session charging control without breaking the normal session control in CSCF 310.

When CSCF 310 receives a SIP message, CSCF 310 routes the SIP message to IMS call control node 301 for session control. After the session charging control, IMS call control node 301 routes the same SIP message back to CSCF 310. Thus, a message interaction between CSCF 310 and IMS call control node 301 will be a loop.

To perform the loop back function, when a SIP request message is routed from mobile station A to CSCF 310, CSCF 310 adds its address to the Via field in the SIP request message. In other embodiments, other fields of the SIP request message may be used. CSCF 310 then routes the SIP request message to IMS call control node 301. After session charging control handling, IMS call control node 301 adds its address to the Via field, which is above the Via field of the address of CSCF 310. IMS call control node 301 then routes the SIP request message back to CSCF 310 for further control processing. When CSCF 310 routes the SIP request message, CSCF 310 adds its address again to the Via field above the address of IMS call control node 301. When the SIP message is routed to mobile station B, there will be at least three Via fields in header of this SIP message. Therefore, there will be a Via field loop: CSCF→IMS gateway system→CSCF.

When the SIP response message is routed back from mobile station B to CSCF 310, CSCF 310 performs any required functions and strips off the top address in the Via field, which is the first instance of the address of CSCF 310. CSCF 310 then routes the SIP response message to the next address in the Via field, which is the address for IMS call control node 301. IMS call control node 301 performs any required functions and strips off the top address in the Via field, which is its address. IMS call control node 301 then routes the SIP response message to CSCF 310. CSCF 310 performs any required functions and strips off the remaining address in the Via field, which is the second instance of the address of CSCF 310. CSCF 310 then routes the SIP response message to mobile station A.

IMS call control node 301 provides many advantages. By consolidating the AS logic 304-306 with the gateway logic 308, the consolidation simplifies IMS network topology and reduces call traffic between CSCF 310 and OCS 320. The consolidation also improves performance and response time of services provided by IMS call control node 301. IMS call control node 301 also provides for online charging of multiple services provided by AS logic 304-306 by using an extension of the Ro protocol. In addition to charging for services, IMS call control node 301 enables real-time session-based online charging.

The following gives three examples of the operation of IMS network 300 in an originating IMS call scenario, a terminating call scenario, and a call re-direction scenario.

EXAMPLE #1

Figure 11:
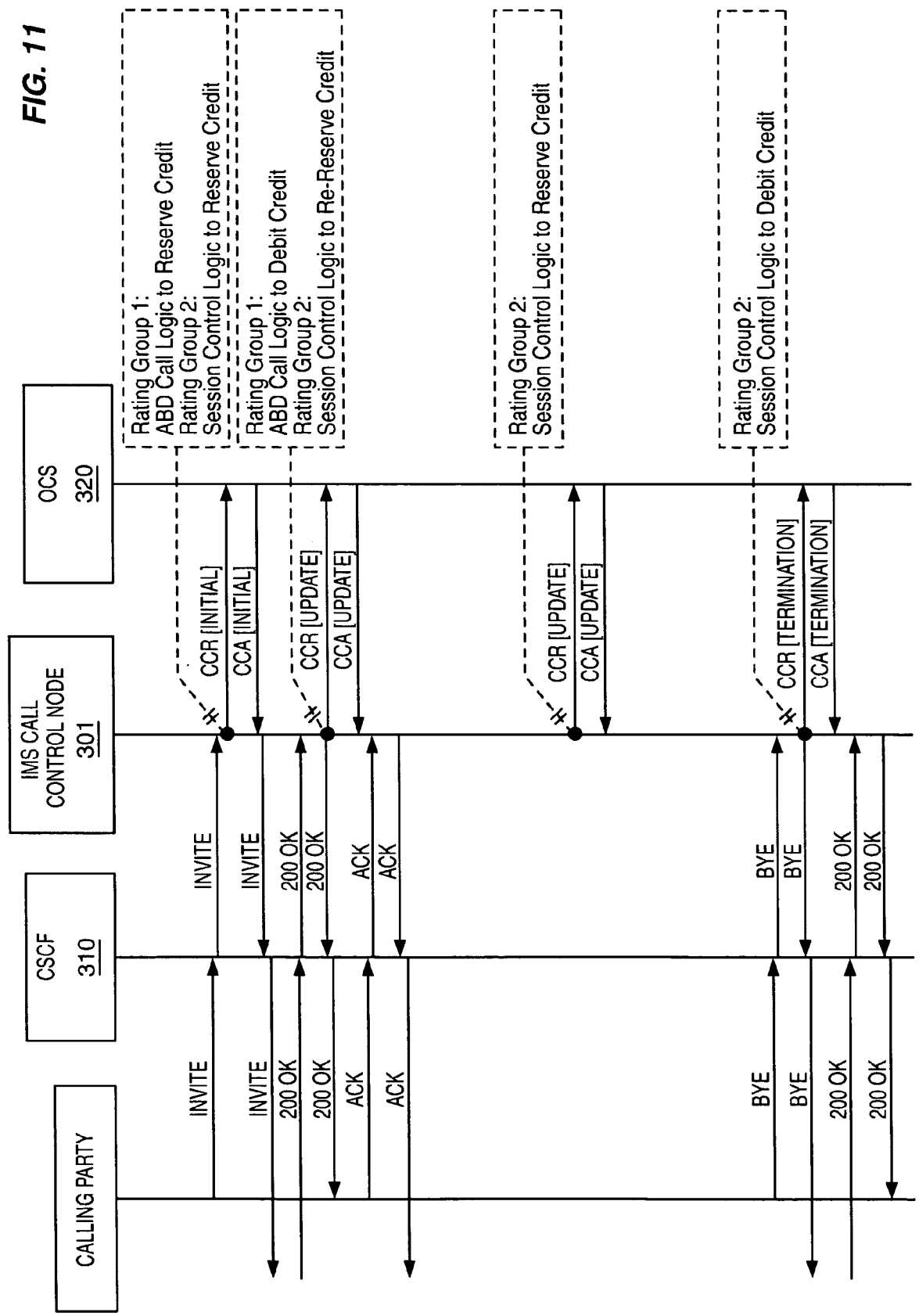
FIG. 11 is a message diagram illustrating an originating IMS call scenario for an IMS network in an exemplary embodiment of the invention.

FIG. 11 illustrates an originating IMS call scenario for IMS network 300 described in FIG. 3. To start, a calling party (or calling party station) transmits a SIP INVITE message to CSCF 310. CSCF 310 transmits the INVITE message to IMS call control node 301. IMS call control node 301 invokes the application service logic to do the following. IMS call control node 301 determines that the called party number is an abbreviated number, and invokes Abbreviated Dialing (ABD) application logic to convert the abbreviated number to a normal call number. The charging Policy Enforcement Point (PEP) in the ABD application logic requests the charging Policy Decision Point (PDP), and determines that the ABD number conversion is charged as rating group 1 (e.g., has a flat charge for the ABD number conversion). After ABD number conversion, IMS call control node 301 treats this session as a normal session for session control. IMS call control node 301 invokes IMS gateway logic, the charging PEP for IMS session control requests the charging PDP, and determines the session charging as rating group 2. In the policy management, the charging trigger point is configured as an INTERRUPT. IMS call control node 301 starts a timer to hold on the current session. The charging trigger rule in the PDP can be expressed as the following:

```
IF  SIP_Method = "INVITE" AND Call_Status = "NULL"
AND Trigger_Point_Type = "INTERRUPT"
THEN
    Hold on the current session
    Send "CCR [INITIAL]" charging report to OCS
    Start timer to wait for the "CCA [INITIAL]" from OCS
END IF
```

IMS call control node 301 transmits a Diameter Credit Control Request (CCR) [INITIAL] message to OCS 320 for credit reserve. In the CCR message, two MSCC AVP's are included. One MSCC AVP is for the credit reserve of the Rating Group 1 (e.g. the flat charge for the ABD number conversion). The other MSCC AVP is for the credit reserve of the Rating Group 2 (e.g. session credit pre-authorization to roughly estimate the maximum session duration the calling party can use).

OCS 320 grants quota units for each rating group respectively, and sets the granted quota in each rating group's MSCC AVP. OCS 320 populates the service specific charging trigger sub-AVP under each MSCC AVP. OCS 320 then transmits a Diameter Credit Control Answer (CCA) [INITIAL] message to IMS call control node 301.

When IMS call control node 301 receives the CCA message and determines whether the session can be allowed, IMS call control node 301 continues the current session handling and transmits the INVITE message to a called party via CSCF 310.

When the called party answers the call, the called party transmits a 200 OK message to CSCF 310. CSCF 310 transmits the 200 OK message to IMS call control node 301. When IMS call control node 301 receives the 200 OK message, IMS call control node 301 requests the charging policy management and the charging rule is evaluated as the following:

```
IF  SIP_Method = "200" AND Call_Status =
"WAIT_FOR_CALL_ANSWER" AND Trigger_Point_Type =
"NOTIFY"
THEN
    Continue the current session.
    Send "CCR [UPDATE]" charging report to OCS
    Start timer to wait for "CCA [UPDATE]" from OCS
END IF
```

Because the charging trigger type is "NOTIFY", IMS call control node 301 does not interrupt the existing session. IMS call control node 301 transmits the 200 OK message to CSCF 310 to let the session continue.

IMS call control node 301 then transmits a Diameter CCR [UPDATE] message to report the charging record to OCS 320. The MSCC AVP of Rating group 1 indicates to OCS 320 to debit the reserved credit because the session is successfully answered. The ABD flat charge is debited from the balance. The MSCC AVP of Rating group 2 indicates to OCS 320 to re-authorize session credit because the session answer time has been consumed at this point. OCS 320 re-reserves the credit from the current session answer time. OCS 320 transmits the CCA [UPDATE] message to IMS call control node 301. The granted quota and expiry time is included in the MSCC AVP for rating group 2. The extended trigger point AVP is also populated in the MSCC AVP for rating group 1 by OCS 320. After receiving the CCA message, IMS call control node 301 dynamically provisions the charging filter criteria in a policy repository. IMS call control node 301 starts a session control timer to real-time monitor the session based on the granted quota.

After receiving the 200 OK message, the calling party transmits a SIP ACK message that is forwarded to IMS call control node 301 by CSCF 310. IMS call control node 301 invokes the PEP to request the PDP to evaluate whether to transmit a charging report to OCS 320. In this example, the following charging filter rule is matched:

```
IF  SIP_Method = "ACK" AND Call_Status = "ANSWERED"
AND Trigger_Point_Type = "NULL"
THEN
    Continue the current session.
END IF
```

Because this message is not armed, IMS call control node 301 lets the SIP message continue, and transmits the ACK message to the called party via CSCF 310. At this point, the granted quota is used up and IMS call control node 301 transmits the used quota to OCS 320 via a CCR [UPDATE] message and requests to allocate the next new quota. OCS 320 determines whether the calling party has enough credit, allocates another new quota for rating group 2, and transmits the new quota via a CCA [UPDATE] message to IMS call control node 301. IMS call control node 301 resets the session control timer to the new quota to real-time monitor the session.

To initiate the end of the current session, the calling party transmits a BYE message that is received by IMS call control node 301 via CSCF 310. IMS call control node 301 invokes the PEP to request the PDP to get the following charging filter rule:

```
IF    SIP_Method = "BYE" AND Call_Status = "In_Progress"
      AND Trigger_Point_Type = "NOTIFY"
THEN
      Continue the current session.
      Send "CCR [TERMINATION]" charging report to OCS
      Start timer to wait "CCA [TERMINATION]" from OCS
END IF
```

IMS call control node 301 allows the SIP message handling to continue and transmits the BYE message to CSCF 310. IMS call control node 301 calculates the quota consumed until the time when the BYE message is received, stops the session control timer, and transmits a CCR [TERMINATION] message to OCS 320 to report the consumed quota. OCS 320 returns a CCA [TERMINATION] message to IMS call control node 301 to indicate that the message has been received. The called party returns a 200 OK message to IMS call control node 301 via CSCF 310 that indicates that the session resource of the called party is released. IMS call control node 301 evaluates no rule to match this 200 OK message under the current session status, so no action is taken to control the session. IMS call control node 301 then transmits a 200 OK message to release the calling party and release the session resource.

EXAMPLE #2

Figure 12:
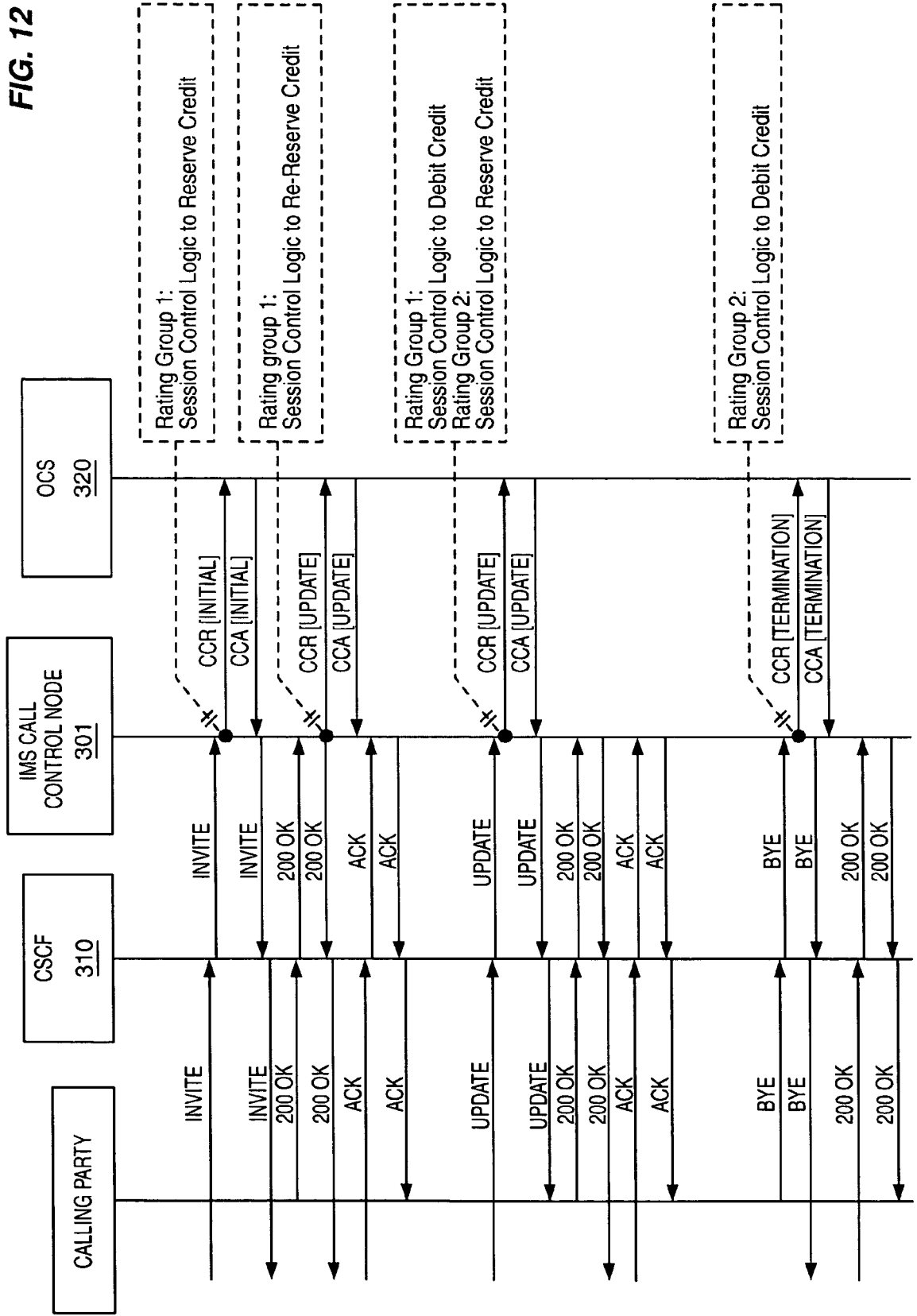
FIG. 12 is a message diagram illustrating a terminating IMS call scenario for an IMS network in an exemplary embodiment of the invention.

FIG. 12 illustrates a terminating IMS call scenario for IMS network 300 described in FIG. 3. To start, CSCF 310 of a called party receives a SIP INVITE message from the calling party. CSCF 310 transmits the INVITE message to IMS call control node 301. IMS call control node 301 invokes the application service logic to do the following. IMS call control node 301 invokes IMS gateway logic, the charging PEP for IMS session control requests the charging PDP, and determines the session charging as rating group 1. In the policy management, the charging trigger point is configured as an INTERRUPT. IMS call control node 301 starts a timer to hold on the current session. The charging trigger rule in the PDP can be expressed as the following:

```
IF    SIP_Method = "INVITE" AND Call_Status = "NULL"
      AND Trigger_Point_Type = "INTERRUPT"
THEN
      Hold on the current session
      Send "CCR [INITIAL]" charging report to OCS
      Start timer to wait for the "CCA [INITIAL]" from OCS
END IF
```

IMS call control node 301 then transmits a Diameter CCR [INITIAL] message to OCS 320 to reserve the credit for the rating group 1 (e.g., session credit pre-authorization to roughly estimate the session duration the called party can use). OCS 320 grants quota units for the rating group 1, and sets the granted quota in this rating group in the MSCC AVP for this rating group. OCS 320 populates the service-specific charging trigger sub-AVP under this MSCC AVP. OCS 320 transmits the Diameter CCA [INITIAL] message to IMS call control node 301.

When IMS call control node 301 receives the CCA message and evaluates that the session can be allowed, IMS call control node 301 continues the current session handling and forwards the INVITE request to the called party via the CSCF 310.

When the called party answers the call, the called party transmits a 200 OK message to CSCF 310. CSCF 310 forwards the 200 OK message to IMS call control node 301. When IMS call control node 301 receives the 200 OK message, IMS call control node 301 requests the charging policy management and the charging rule is evaluated as the following:

```
IF    SIP_Method = "200" AND Call_Status =
      "WAIT_FOR_CALL_ANSWER" AND Trigger_Point_Type =
      "NOTIFY"
THEN
      Continue the current session.
      Send "CCR [UPDATE]" charging report to OCS
      Start timer to wait for "CCA [UPDATE]" from OCS
END IF
```

Because the charging trigger type is "NOTIFY", IMS call control node 301 does not interrupt the existing session. IMS call control node 301 transmits the 200 OK message to CSCF 310 to let the session continue. IMS call control node 301 transmits a Diameter CCR [UPDATE] message to report the call answer time to OCS 320. The MSCC AVP of rating group 1 indicates to OCS 320 to re-authorize session credit because the session answer time has ended at this point. OCS 320 re-reserves the credit from the current session answer time.

OCS 320 transmits the CCA [UPDATE] message to IMS call control node 301. The granted quota and expiry time is included in the MSCC AVP for rating group 2. The extended trigger point AVP (such as the media component update AVP) is also populated in the MSCC AVP by OCS 320. When receiving the CCA message, IMS call control node 301 dynamically provisions charging filter criteria in a policy repository. IMS call control node 301 starts a session control timer to real-time monitor the session based on the granted quota.

When receiving the 200 OK message, the calling party transmits a SIP ACK message, which is forwarded to IMS call control node 301 by CSCF 310. After IMS call control node 301 receives the ACK message, IMS call control node 301 invokes the PEP to request the PDP to evaluate whether to transmit a charging report to OCS 320. In this example, the following charging filter rule is matched:

```
IF    SIP_Method = "ACK" AND Call_Status = "ANSWERED"
      AND Trigger_Point_Type = "NULL"
THEN
      Continue the current session.
END IF
```

Because this message is not armed, IMS call control node 301 lets the SIP message continue, and transmits the ACK message to the called party via CSCF 310. IMS call control node 301 sets the call status to In Progress. At this point, the media component of the calling party is updated, and the calling party transmits a SIP UPDATE message to CSCF 310. CSCF 310 transmits the UPDATE message to IMS call control node 301. IMS call control node 301 evaluates the UPDATE message of this session. IMS call control node 301 invokes the charging PEP for IMS session control requests charging PDP, and determines that the session charging as rating group 2. The charging trigger point is evaluated as the following:

```
IF    SIP_Method = "UPDATE" AND Call_Status = "In_Progress"
AND Trigger_Point_Type = "INTERRUPT"
THEN
      Hold on the current session
      Send "CCR [UPDATE]" charging report to OCS
      Start timer to wait for "CCA [UPDATE]" from OCS
END IF
```

IMS call control node 301 calculates the used quota for rating group 1, and transmits the Diameter CCR message to report the charging record. Two MSCC AVPs are included in the CCR message. One MSCC AVP is used to report the used quota for rating group 1, and debit credit from subscriber balance in OCS 320. Another MSCC AVP is added to request credit for rating group 2 due to the media component update.

When IMS call control node 301 receives the CCA message, IMS call control node 301 resets the session control timer to the newly allocated quota for rating group 2. IMS call control node 301 transmits the UPDATE message to called party via CSCF 310. For the ACK message under current session update status, IMS call control node 301 doesn't have charging filter criteria. IMS call control node 301 forwards the ACK message to the calling party message, and transmits the ACK message from the calling party to the called party.

When the called party ends the current session, the called party transmits a BYE message to IMS call control node 301 via CSCF 310. IMS call control node 301 invokes the charging PEP to request the charging PDP. The charging trigger point is evaluated as follows:

```
IF    SIP_Method = "BYE" AND Call_Status = "In_Progess"
AND Trigger_Point_Type = "NOTIFY"
THEN
      Continue the current session.
      Send "CCR [TERMINATION]" charging report to OCS
      Start timer to wait "CCA [TERMINATION]" from OCS
END IF
```

IMS call control node 301 lets the SIP message handling continue, and transmits the BYE message to the calling party via CSCF 310. IMS call control node 301 calculates the used quota until the time when the BYE message is received, and stops the session control timer. IMS call control node 301 transmits a CCR [TERMINATION] message to OCS 320 to report the consumed quota. OCS 320 transmits a CCA [TERMINATION] message to IMS call control node 301 to indicate the message has been received. The calling party returns a 200 OK message to indicate the session resource of calling party is released. When IMS call control node 301 evaluates that no rules match this message for charging report under the current session status, no action is taken to control the session. IMS call control node 301 transmits a 200 OK message to release the session resource.

EXAMPLE #3

Figure 13:
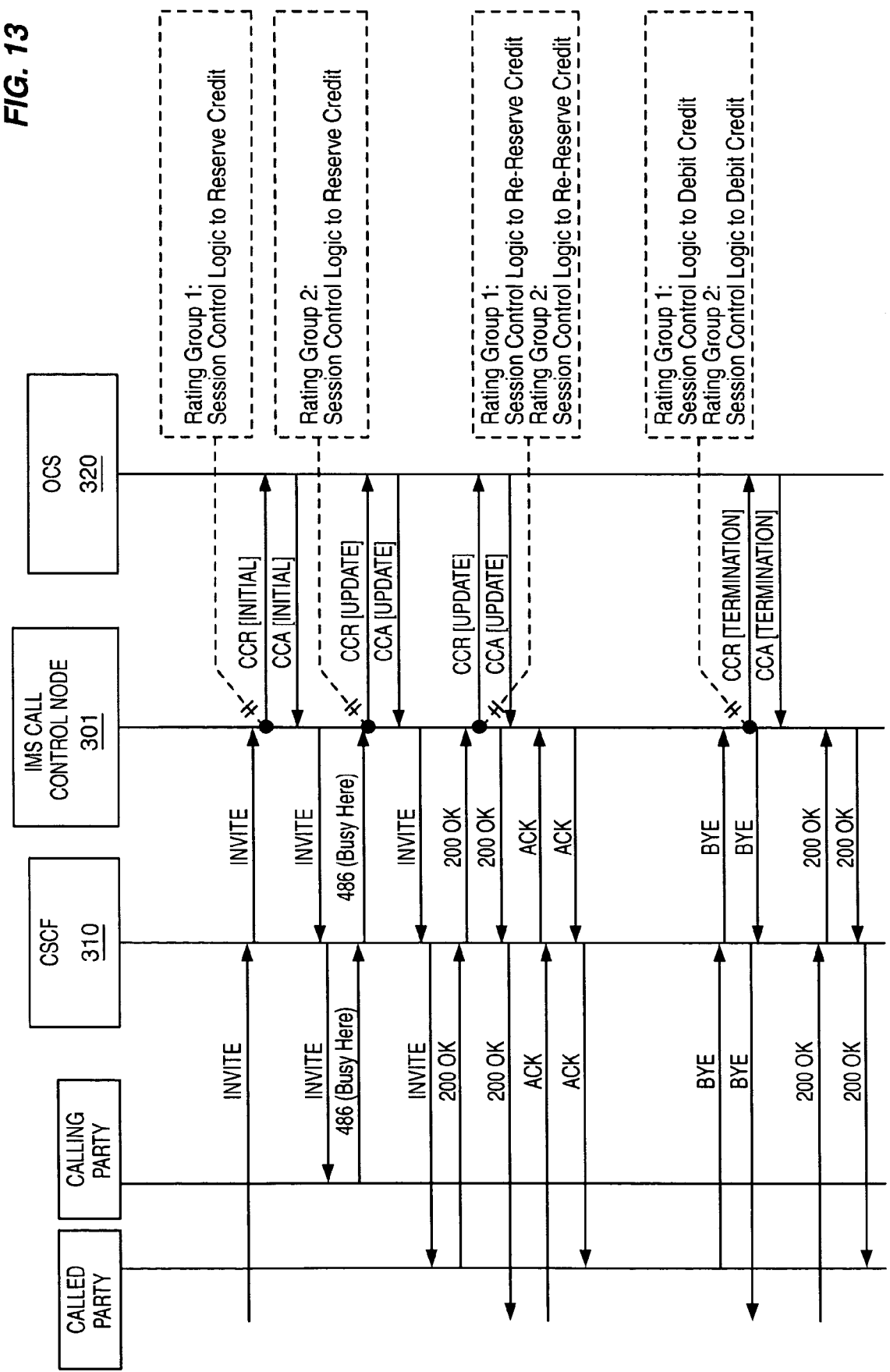
FIG. 13 is a message diagram illustrating a call re-direction scenario for an IMS network in an exemplary embodiment of the invention.

FIG. 13 illustrates a call re-direction scenario for IMS network 300 described in FIG. 3. To start, a calling party (or calling party station) transmits a SIP INVITE message to CSCF 310. CSCF 310 transmits the INVITE message to IMS call control node 301. IMS call control node 301 invokes the application service logic to do the following. IMS call control node 301 invokes IMS gateway logic, the charging PEP for IMS session control requests the charging PDP, and determines the session charging as rating group 1. In the policy management, the charging trigger point is configured as an INTERRUPT. IMS call control node 301 starts a timer to hold on the current session. The charging trigger rule in the PDP can be expressed as the following:

```
IF    SIP_Method = "INVITE" AND Call_Status = "NULL"
AND Trigger_Point_Type = "INTERRUPT"
THEN
      Hold on the current session
      Send "CCR [INITIAL]" charging report to OCS
      Start timer to wait for the "CCA [INITIAL]" from OCS
END IF
```

IMS call control node 301 then transmits a Diameter CCR [INITIAL] message to OCS 320 to reserve the credit for the rating group 1 (e.g., session credit pre-authorization to roughly estimate the session duration the called party can use). OCS 320 grants quota units for the rating group 1, and sets the granted quota in this rating group in the MSCC AVP for this rating group. OCS 320 populates the service-specific charging trigger sub-AVP under this MSCC AVP. OCS 320 then transmits the CCA [INITIAL] message to IMS call control node 301. When IMS call control node 301 receives the CCA message and determines whether the session can be allowed, IMS call control node 301 continues the current session handling and transmits the INVITE message to a called party via CSCF 310.

At this point, the calling party is accepting another call, so the called party transmits a 486 BUSY message to CSCF 310. CSCF 310 transmits the 486 BUSY message to IMS call control node 301. When IMS call control node 301 receives the 486 BUSY message, IMS call control node 301 requests the charging policy management and the charging rule is evaluated as the following:

```
IF    SIP_Method = "486" AND Call_Status =
      "WAIT_FOR_CALL_ANSWER" AND Trigger_Point_Type =
      "INTERRUPT"
THEN
      Continue the current session.
      Send "CCR [UPDATE]" charging report to OCS
      Start timer to wait for "CCA [UPDATE]" from OCS
END IF
```

Because the charging trigger type is "INTERRUPT", IMS call control node 301 interrupts the existing session. IMS call control node 301 holds the current session for the call control handling. IMS call control node 301 determines that the called party has subscribed to call re-direction service. The following-service control rule is determined from PDP:

```
IF    Call Status = "On_Busy" AND Time_Category =
      "Working Hour" And Calling_Party_Category = "Colleague"
      THEN Redirect Call to "The phone number of UE2"
END IF
```

IMS call control node 301 then transmits a Diameter CCR [UPDATE] message to OCS 320 to reserve the credit for the rating group 2 (e.g., session credit pre-authorization to roughly estimate the session duration from the calling party to the called party).

OCS 320 grants quota units for the rating group 2, and sets the granted quota in the rating group 2 in the MSCC AVP.

OCS 320 populates the service-specific charging trigger sub-AVP under this MSCC AVP. OCS 320 then transmits the Diameter Credit Control Answer (CCA) [UPDATE] to IMS call control node 301. IMS call control node 301 determines whether the calling party has enough quotas for call redirection, then transmits an INVITE message to the called party via CSCF 310.

The called party answers the call and transmits a 200 OK message to CSCF 310. CSCF 310 forwards this message to IMS call control node 301. IMS call control node 301 receives the 200 OK message, and requests the charging policy management. The charging rule is evaluated as the following:

```
IF    SIP_Method = "200" AND" Call_Status=
"WAIT_FOR_CALL_ANSWER" AND Trigger_Point_Type =
"NOTIFY"
THEN
    Continue the current session.
    Send "CCR [UPDATE]" charging report to OCS
    Start timer to wait "CCA [UPDATE]" from OCS
END IF
```

Because the charging trigger type is "NOTIFY", IMS call control node 301 does not interrupt the existing session. IMS call control node 301 transmits the 200 OK message to CSCF 310 to let the session continue. IMS call control node 301 transmits Diameter CCR [UPDATE] to report the call answer time to OCS 320. MSCC AVPs of rating group 1 (call charge from calling party to called party) and rating group 2 (call charge from calling party to called party for call redirection) indicates to OCS 320 to re-authorize session credit because the session answer time is reached at this point. OCS 320 re-reserves the credit from the current session answer time. IMS call control node 301 transmits the 200 OK message to the calling party via CSCF 310.

OCS 320 transmits a CCA [UPDATE] to IMS call control node 301. The granted unit and expiry time is included in the MSCC AVPs for rating group 1 and rating group 2 separately. The extended trigger point AVP is also populated in MSCC AVP by OCS 320. After receiving the CCA response, IMS call control node 301 dynamically provisions these charging filter criteria in the policy repository. IMS call control node 301 starts the session control timer to real-time monitor the session going based on reserved quota.

After receiving the 200 OK message, the calling party transmits a SIP ACK message that is forwarded to IMS call control node 301 by CSCF 310. IMS call control node 301 invokes the PEP to request the PDP to evaluate whether to transmit a charging report to OCS 320. In this example, the following charging filter rule is matched:

```
IF    SIP_Method = "ACK" AND Call_Status = "ANSWERED"
AND Trigger_Point_Type = "NULL"
THEN
    Continue the current session.
END IF
```

Because this message is not armed, IMS call control node 301 lets the SIP message continue, and transmits the ACK message to the called party via CSCF 310.

When the called party ends the current session, the called party transmits a BYE message to IMS call control node 301 via CSCF 310. IMS call control node 301 invokes the charging PEP to request the charging PDP. The charging trigger point is evaluated as follows:

```
IF    SIP_Method = "BYE" AND Call_Status = "In_Progess"
AND Trigger_Point_Type = "NOTIFY"
THEN
    Continue the current session.
    Send "CCR [TERMINATION]" charging report to OCS
    Start timer to wait "CCA [TERMINATION]" from OCS
END IF
```

IMS call control node 301 lets the SIP message handling continue, and transmits the BYE message to the calling party via CSCF 310. IMS call control node 301 calculates the used quota for rating group 1 and rating group 2 until the time when the BYE message is received, and stops the session control timer. IMS call control node 301 transmits a CCR [TERMINATION] message to OCS 320 to report the consumed quota. IMS call control transmits the BYE message to the calling party through CSCF 310. OCS 320 transmits a CCA [TERMINATION] message to IMS call control node 301 to indicate the message has been received. The calling party returns a 200 OK message to indicate the session resource of calling party is released. When IMS call control node 301 evaluates that no rules match this message for charging report under the current session status, no action is taken to control the session. IMS call control node 301 transmits a 200 OK message to release the session resource.

We claim:

1. An IP Multimedia Subsystem (IMS) call control node for providing online charging in an IMS network, the IMS call control node comprising:

a first interface operable to communicate with a call session control function (CSCF) according to a first protocol;

a second interface operable to communicate with an online charging server (OCS) according to a second protocol;

a processing system coupled to the first interface and the second interface;

application server (AS) logic executable by the processing system to provide a plurality of services; and gateway logic executable by the processing system;

the processing system:

receives a call message from the CSCF through the first interface according to the first protocol, determines whether to execute the AS logic or the gateway logic responsive to the call message, executes the AS logic to perform a service responsive to a determination to execute the AS logic, executes the AS logic to contact the OCS for online charging for the service through the second interface according to the second protocol, executes the gateway logic to perform call session control responsive to a determination to execute the gateway logic, and executes the gateway logic to contact the OCS for online charging for a call session through the second interface according to the second protocol.

2. The IMS call control node of claim 1 wherein the AS logic contacts the OCS by transmitting a Diameter Credit Control Application request message to the OCS.

3. The IMS call control node of claim 2 wherein the AS logic inserts charging information for the service into a new field of the Diameter Credit Control Application request message to report the charging information for the service to the OCS.

4. The IMS call control node of claim 1 wherein the call message comprises a Session Initiation Protocol (SIP) message.

5. The IMS call control node of claim 1 wherein the processing system contacts the OCS for online charging for the call session by executing the gateway logic to:
   process the call message in the first protocol to determine whether to contact the OCS for online charging for the call session;
   generate a request message in the second protocol that comprises a charging request for the call session responsive to a determination to contact the OCS, wherein generating the request message includes mapping fields of the call message in the first protocol to fields in the request message in the second protocol; and
   transmit the request message to the OCS through the second interface.

6. The IMS call control node of claim 5 wherein the request message comprises a Diameter Credit Control Application request message.

7. The IMS call control node of claim 1 further comprising:
   an application server (AS) manager that processes the call message and generates a sequence list for executing the AS logic to perform the service.

8. A method of operating an IP Multimedia Subsystem (IMS) call control node for providing online charging in an IMS network, wherein the IMS call control node comprises a first interface for communicating with a call session control function (CSCF) according to a first protocol, a second interface for communicating with an online charging server (OCS) according to a second protocol, a processing system coupled to the first interface and the second interface, Application Server (AS) logic, and gateway logic, the method comprising:
   receiving a call message in the processing system from the CSCF through the first interface according to the first protocol,
   determining whether to execute the AS logic or the gateway logic responsive to the call message,
   executing the AS logic in the processing system to perform a service responsive to a determination to execute the AS logic,
   executing the AS logic in the processing system to contact the OCS for online charging for the service through the second interface according to the second protocol,
   executing the gateway logic in the processing system to perform call session control responsive to a determination to execute the gateway logic, and
   executing the gateway logic in the processing system to contact the OCS for online charging for a call session through the second interface according to the second protocol.

9. The method of claim 8 wherein the step of executing the AS logic in the processing system to contact the OCS comprises:
   executing the AS logic to transmit a Diameter Credit Control Application request message to the OCS.

10. The method of claim 9 wherein the step of executing the AS logic to transmit a Diameter Credit Control Application request message to the OCS comprises:
   executing the AS logic to insert charging information for the service into a new field of the Diameter Credit Control Application request message to report the charging information for the service to the OCS.

11. The method of claim 8 wherein the call message comprises a Session Initiation Protocol (SIP) message.

12. The method of claim 8 wherein the step of executing the gateway logic in the processing system to contact the OCS for online charging comprises:
   processing the call message in the first protocol to determine whether to contact the OCS for online charging for the call session;
   generating a request message in the second protocol that comprises a charging request for the call session responsive to a determination to contact the OCS, wherein generating the request message includes mapping fields of the call message in the first protocol to fields in the request message in the second protocol; and
   transmitting the request message to the OCS through the second interface.

13. The method of claim 12 wherein the request message comprises a Diameter Credit Control Application request message.

14. The method of claim 8 wherein the step of executing the AS logic in the processing system to perform a service comprises:
   processing the call message in an application server (AS) manager; and
   generating a sequence list for executing the AS logic to perform the service.

15. An IP Multimedia Subsystem (IMS) call control node for providing online charging in an IMS network, the IMS call control node comprising:
   an IMS service control (ISC) interface operable to communicate with a call session control function (CSCF) according to ISC protocol;
   an Ro interface operable to communicate with an online charging server (OCS) according to Ro protocol;
   a processing system coupled to the ISC interface and the Ro interface;
   application server (AS) logic executable by the processing system to provide a plurality of services; and
   gateway logic executable by the processing system;
   the processing system:
      receives a call message from the CSCF through the ISC interface according to the ISC protocol,
      determines whether to execute the AS logic or the gateway logic responsive to the call message,
      executes the AS logic to perform a service responsive to a determination to execute the AS logic, and executes the AS logic to contact the OCS for online charging for the service through the Ro interface according to the Ro protocol, and
      executes the gateway logic to perform call session control responsive to a determination to execute the gateway logic, and executes the gateway logic to contact the OCS for online charging for a call session through the Ro interface according to the Ro protocol.

16. The IMS call control node of claim 15 wherein the AS logic contacts the OCS by transmitting a Diameter Credit Control Application request message to the OCS, wherein the Diameter Credit Control Application request message includes an extension field.

17. The IMS call control node of claim 16 wherein the AS logic inserts charging information for the service into the extension field of the Diameter Credit Control Application request message to report the charging information for the service to the OCS.

18. The IMS call control node of claim 17 wherein the gateway logic contacts the OCS by transmitting a Diameter Credit Control Application request message to the OCS.

* * * * *